US012718723B2

(12) United States Patent
Park et al.

(10) Patent No.: US 12,718,723 B2
(45) Date of Patent: Aug. 25, 2026

(54) DISPLAY DEVICE AND ELECTRONIC DEVICE INCLUDING THE SAME

(71) Applicant: Samsung Display Co., LTD., Yongin-si (KR)

(72) Inventors: Kyeong Min Park, Yongin-si (KR); Kyung Bae Kim, Yongin-si (KR); Jin Seon Kwak, Yongin-si (KR); Dong Woo Kim, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 19/060,314

(22) Filed: Feb. 21, 2025

(65) Prior Publication Data

US 2025/0308423 A1 Oct. 2, 2025

(30) Foreign Application Priority Data

Apr. 2, 2024 (KR) ........................ 10-2024-0044878
Dec. 18, 2024 (KR) ........................ 10-2024-0189713

(51) Int. Cl.
*G09G 3/20* (2006.01)

(52) U.S. Cl.
CPC ....... *G09G 3/20* (2013.01); *G09G 2300/0413* (2013.01); *G09G 2310/0267* (2013.01); *G09G 2320/02* (2013.01)

(58) Field of Classification Search
CPC ............. G09G 3/20; G09G 2300/0413; G09G 2310/0267; G09G 2320/02
See application file for complete search history.

(56) References Cited

U.S. PATENT DOCUMENTS 8,248,130 B2 * 8/2012 Jain ...................... H03K 5/1565 327/175
8,274,460 B2 * 9/2012 Moon .................. G09G 3/3696 345/87
8,395,744 B2 * 3/2013 Yoshida ................ G02F 1/1345 349/149
9,330,588 B2 5/2016 Kasai
9,632,378 B2 * 4/2017 Abe .................. G02F 1/136286
11,521,551 B2 * 12/2022 Onoyama ............ G09G 3/3266
2011/0037747 A1 * 2/2011 Lee ...................... G09G 3/3677 345/211
2013/0162304 A1 * 6/2013 Kim ..................... G09G 3/3677 327/109
2013/0307758 A1 * 11/2013 Kim ..................... G09G 3/3648 345/55

(Continued)

FOREIGN PATENT DOCUMENTS

JP 5958055 B2 7/2016

*Primary Examiner* — Nitin Patel
(74) *Attorney, Agent, or Firm* — Womble Bond Dickinson (US) LLP

(57) ABSTRACT

A display device includes a display panel including a first block and a second block, the display panel having a plurality of pixels located therein, and a first gate driver configured to provide a gate signal to the first block and the second block, wherein the first gate driver provides the gate signal to a first sub-gate line connected to the first block through a first buffer and a first slew rate controller, and provides the gate signal to a second sub-gate line connected to the second block through a second buffer, and wherein the first block is closer to the first gate driver than the second block.

20 Claims, 17 Drawing Sheets

(56) References Cited

U.S. PATENT DOCUMENTS

| | | | | |
|---|---|---|---|---|
| 2015/0130851 | A1* | 5/2015 | Jeong | G09G 3/3688 345/82 |
| 2016/0171933 | A1* | 6/2016 | Takahara | G09G 3/3233 345/212 |
| 2018/0286305 | A1* | 10/2018 | Kim | G09G 3/3275 |

* cited by examiner

DISPLAY DEVICE AND ELECTRONIC DEVICE INCLUDING THE SAME

CROSS-REFERENCE TO RELATED APPLICATIONS

The present application claims priority to and the benefit of Korean Patent Application No. 10-2024-0044878, filed on Apr. 2, 2024, and to the benefit of Korean Patent Application No. 10-2024-0189713, filed on Dec. 18, 2024, in the Korean Intellectual Property Office, the entire disclosures of each of which are incorporated herein by reference.

BACKGROUND

1. Field

Aspects of some embodiments of the present disclosure generally relate to a display device and an electronic device including the display device.

2. Description of the Related Art

With the development of information technologies, the importance of a display device which provides a connection medium between a user and information increases. Accordingly, display devices such as liquid crystal display devices and organic light emitting display devices are increasingly used.

A display device generally has a structure in which a gate driver is located at a side of a pixel unit. Due to a gate line delay, a variation in gate signal may occur as approaching an end of a gate line, and accordingly, display quality may be deteriorated.

The above information disclosed in this Background section is only for enhancement of understanding of the background and therefore the information discussed in this Background section does not necessarily constitute prior art.

SUMMARY

Aspects of some embodiments include a display device for dividing a gate line according to a distance between a gate driver and a pixel and an electronic device including the display device so as to reduce a gate line delay.

According to some embodiments of the present disclosure, a display device includes: a display panel including a first block and a second block, the display panel having a plurality of pixels; and a first gate driver configured to a gate signal to the first block and the second block, wherein the first gate driver provides the gate signal to a first sub-gate line connected to the first block through a first buffer and a first slew rate controller, and provides the gate signal to a second sub-gate line connected to the second block through a second buffer, and wherein the first block is closer to the first gate driver than the second block.

According to some embodiments, the first slew rate controller may control a slew rate of the first sub-gate line such that the slew rate of the first sub-gate line and a slew rate of the second sub-gate line are the same.

According to some embodiments, numbers of inverters included in the first buffer and the second buffer are the same.

According to some embodiments, a number of inverters included in the first buffer may be smaller than a number of inverters included in the second buffer.

According to some embodiments, a pixel most distant from the first gate driver in the first block and a pixel closest to the first gate driver in the second block may have the same resistor-capacitor delay value.

According to some embodiments, the display device may further include a dummy gate line in the second block to have the same pattern shape as pixels of the first block.

According to some embodiments, the dummy gate line may extend in a direction distant from the first gate driver at a scan start point of the second block.

According to some embodiments, the dummy gate line may extend with a margin at the scan start point of the second block.

According to some embodiments, the second sub-gate line and the dummy gate line may be formed in the same metal layer.

According to some embodiments, a scan start point of the first sub-gate line in the second block may be a middle point of the second block.

According to some embodiments, a scan start point of the first sub-gate line in the second block may be a pixel closest to the first gate driver in the second block.

According to some embodiments, a scan start point of the first sub-gate line in the second block may be a pixel most distant from the first gate driver in the second block.

According to some embodiments, the display panel may further include a third block and a fourth block. According to some embodiments, the display device may further include a second gate driver configured to provide the gate signal to the third block and the fourth block. According to some embodiments, the second gate driver may provide the gate signal to a third sub-gate line connected to the third block through a third buffer and a second slew rate controller, and provide the gate signal to a fourth sub-gate line connected to the fourth block through a fourth buffer. According to some embodiments, the third block may be closer to the first gate driver than the fourth block.

According to some embodiments of the present disclosure, a display device includes: a display panel including a first block and a second block, the display panel having a plurality of pixels; and a first gate driver configured to provide a gate signal to the first block and the second block, wherein the first gate driver provides the gate signal to a first sub-gate line connected to the first block through a first buffer, and provides the gate signal to a second sub-gate line connected to the second block through a second buffer, and wherein the first block is closer to the first gate driver than the second block.

According to some embodiments, a number of inverters included in the first buffer may be smaller than a number of inverters included in the second buffer.

According to some embodiments, the first buffer may control a slew rate of the first sub-gate line such that the slew rate of the first sub-gate line and a slew rate of the second sub-gate line are the same.

According to some embodiments, the first gate driver may provide the gate signal to the first sub-gate line through the first buffer and a slew rate controller. According to some embodiments, a number of inverters included in the first buffer may be equal to a number of inverters included in the second buffer.

According to some embodiments, a pixel most distant from the first gate driver in the first block and a pixel closest to the first gate driver in the second block may have the same resistor-capacitor delay value.

According to some embodiments, the display device may further include a dummy gate line in the second block to have the same pattern shape as pixels of the first block.

According to some embodiments, the dummy gate line may extend in a direction distant from the first gate driver at a scan start point of the second block.

In accordance with an aspect of the present disclosure, there is provided an electronic device including: a processor, and a display device configured to display an image in response to control of the processor, wherein the display device includes: a display panel including a first block and a second block, the display panel having a plurality of pixels therein, and a first gate driver configured to provide a gate signal to the first block and the second block, wherein the first gate driver: provides the gate signal to a first sub-gate line connected to the first block through a first buffer and a first slew rate controller, and provides the gate signal to a second sub-gate line connected to the second block through a second buffer, and wherein the first block is closer to the first gate driver than the second block.

BRIEF DESCRIPTION OF THE DRAWINGS

Aspects of some embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the example embodiments to those skilled in the art.

In the drawing figures, dimensions may be exaggerated for clarity of illustration. It will be understood that when an element is referred to as being "between" two elements, it can be the only element between the two elements, or one or more intervening elements may also be present. Like reference numerals refer to like elements throughout.

DETAILED DESCRIPTION

Figure 1:
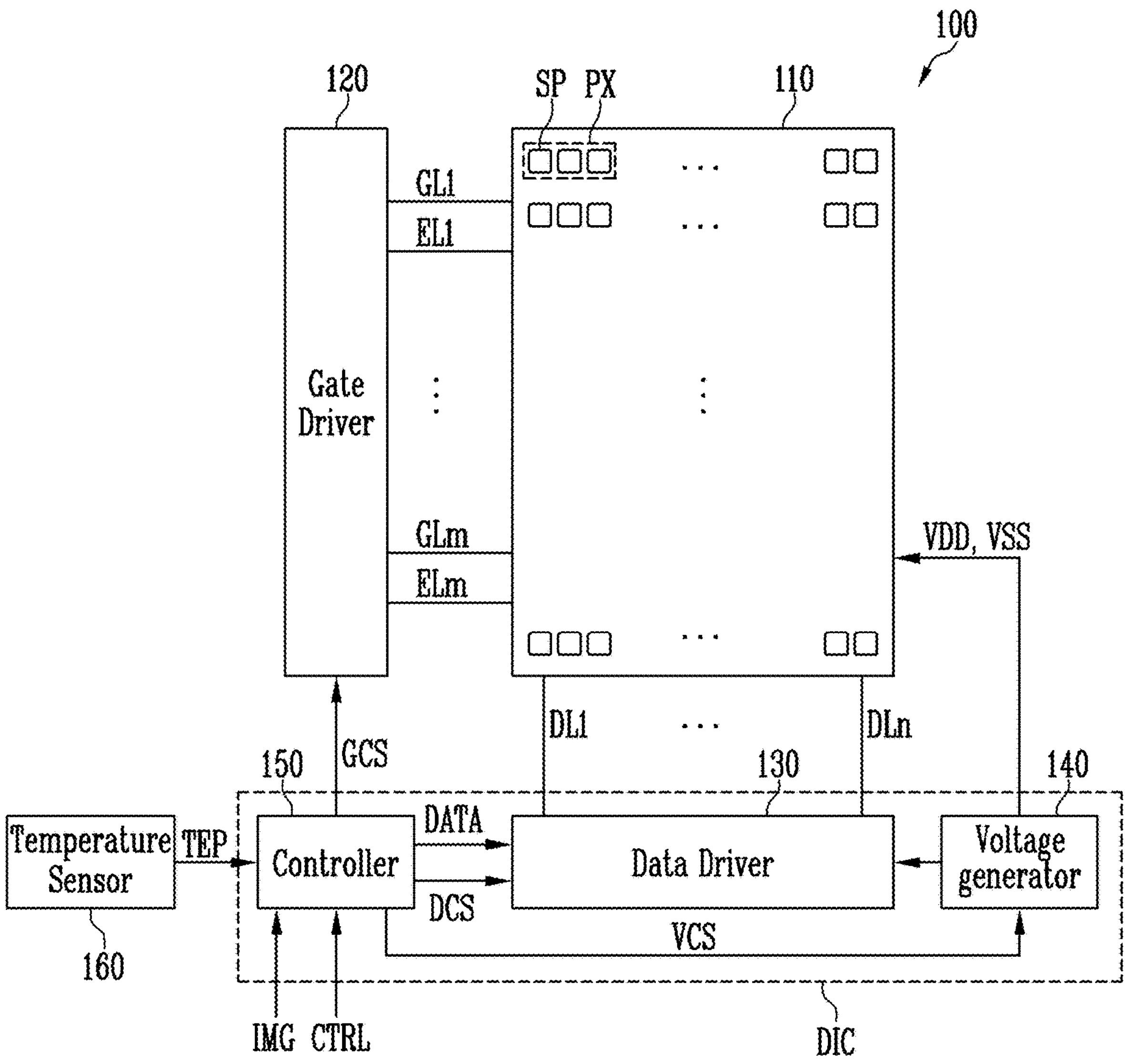
FIG. 1 is a block diagram illustrating aspects of a display device according to some embodiments.

Hereinafter, aspects of some embodiments of the present disclosure are described in detail with reference to the accompanying drawings so that those skilled in the art may easily practice the present disclosure. Embodiments according to the present disclosure may be implemented in various different forms and is not limited to the disclosed embodiments described in the present specification.

Certain components that are irrelevant to enabling a person having ordinary skill in the art to understand the invention may be omitted to more clearly describe aspects of some embodiments of the present disclosure, and the same or similar constituent elements will be designated by the same reference numerals throughout the specification. Therefore, the same reference numerals may be used in different drawings to identify the same or similar elements.

In description, the expression "equal" may mean "substantially equal." That is, this may mean equality to a degree to which those skilled in the art can understand the equality. Other expressions may be expressions in which "substantially' is omitted.

Some embodiments are described in the accompanying drawings in relation to functional blocks, units, and/or modules. Those skilled in the art will understand that these blocks, units, and/or modules are physically implemented by logic circuits, individual components, microprocessors, hard wire circuits, memory elements, line connection, and other electronic circuits. This may be formed by using semiconductor-based manufacturing techniques or other manufacturing techniques. In the case of blocks, units, and/or modules implemented by microprocessors or other similar hardware, the units, and/or modules are programmed and controlled by using software, to perform various functions discussed in the present disclosure, and may be selectively driven by firmware and/or software. In addition, each block, each unit, and/or each module may be implemented by dedicated hardware or by a combination dedicated hardware to perform some functions of the block, the unit, and/or the module and a processor (e.g., one or more programmed microprocessors and associated circuitry) to perform other functions of the block, the unit, and/or the module. In some embodiments, the blocks, the units, and/or the modules may be physically separated into two or more individual blocks, two or more individual units, and/or two or more individual modules without departing from the scope of the present disclosure. Also, in some embodiments, the blocks, the units, and/or the modules may be physically separated into more complex blocks, more complex units, and/or more complex modules without departing from the scope of the present disclosure.

The term "connection" between two components may include both electrical connection and physical connection, but embodiments according to the present disclosure are not limited thereto. For example, the term "connection" used based on circuit diagrams may mean electrical connection, and the term "connection" used based on sectional and plan views may mean physical connection.

It will be understood that, although the terms "first," "second," etc. may be used herein to describe various elements, these elements should not be limited by these terms. These terms are only used to distinguish one element from another element. Thus, a "first" element discussed below could also be termed a "second" element without departing from the teachings of the present disclosure.

Meanwhile, the present disclosure is not limited to embodiments disclosed below, and may be implemented in various forms. Each embodiment disclosed below may be independently embodied or be combined with at least another embodiment prior to being embodied.

FIG. 1 is a block diagram illustrating aspects of a display device according to some embodiments.

Referring to FIG. 1, the display device 100 may include a display panel 110, a gate driver 120, a data driver 130, a voltage generator 140, and a controller 150.

The display panel 110 may include sub-pixels SP. The sub-pixels SP may be connected to the gate driver 120 through first to mth gate lines GL1 to GLm. The sub-pixels SP may be connected to the data driver 130 through first to nth data lines DL1 to DLn.

Each of the sub-pixels SP may include at least one light emitting element configured to generate light. Accordingly, each of the sub-pixels SP may generate light of a specific color such as red, green, blue, cyan, magenta or yellow. Two or more sub-pixels among the sub-pixels SP may constitute one pixel PX. For example, three sub-pixels SP may constitute one pixel PX as shown in FIG. 1.

The gate driver 120 may be connected to the sub-pixels SP arranged in a row direction through the first to mth gate lines GL1 to GLm. The gate driver 120 may output gate signals to the first to mth gate lines GL1 to GLm in response to a gate control signal GCS. According to some embodiments, the gate control signal GCS may include a start signal indicating a start of each frame, a horizontal synchronization signal for outputting gate signals in synchronization with timings at which data signals are applied, and the like.

According to some embodiments, first to mth light emitting control lines EL1 to ELm connected to the sub-pixels SP in the row direction may be further provided. The gate driver 120 may include an emission control driver configured to control the first to mth emission control lines EL1 to ELm, and the emission control driver may operate under the control of the controller 150.

The gate driver 120 may be located at one side of the display panel 110. However, embodiments according to the present disclosure are not limited thereto. For example, the gate driver 120 may be divided into two or more drivers which are physically and/or logically divided, and these drivers may be located at one side of the display panel 110 and the other side of the display panel 110, which is opposite to the one side. As such, in some embodiments, the gate driver 120 may be arranged in various forms at the periphery of the display panel 110.

The data driver 130 may be connected to the sub-pixels SP arranged in a column direction through the first to nth data lines DL1 to DLn. The data driver 130 may receive image data DATA and a data control signal DCS from the controller 150. The data driver 130 may operate in response to the data control signal DCS. According to some embodiments, the data control signal DCS may include a source start pulse, a source shift clock, a source output enable signal, and the like.

The data driver 130 may apply data signals having grayscale voltages corresponding to the image data DATA to the first to nth data lines DL1 to DLn by using voltages from the voltage generator 140. When a gate signal is applied to each of the first to mth gate lines GL1 to GLm, data signals corresponding to the image data DATA may be applied to the data line DL1 to DLm. Accordingly, corresponding sub-pixels SP may generate light corresponding to the data signals. Accordingly, an image may be displayed on the display panel 110.

According to some embodiments, the gate driver 120 and the data driver 130 may include complementary metal-oxide semiconductor (CMOS) circuit elements.

The voltage generator 140 may operate in response to a voltage control signal VCS from the controller 150. The voltage generator 140 may be configured to generate a plurality of voltages and provide the generated voltages to components of the display device 100. For example, the voltage generator 140 may be configured to generate a plurality of voltages by receiving an input voltage from the outside of the display device 100, adjusting the received voltage, and regulating the adjusted voltage.

The voltage generator 140 may generate a first power voltage VDD and a second power voltage VSS, and the generated first and second power voltages VDD and VSS may be provided to the sub-pixels SP. The first power voltage VDD may have a relatively high voltage level, and the second power voltage VSS may have a voltage level lower than the voltage level of the first power voltage VDD. According to some embodiments, the first power voltage VDD or the second power voltage VSS may be provided by an external device of the display device 100.

Besides, the voltage generator 140 may generate various voltages. For example, the voltage generator 140 may generate an initialization voltage applied to the sub-pixels SP. For example, a reference voltage (e.g., a set or predetermined reference voltage) may be applied to the first to nth data lines DL1 to DLn in a sensing operation for sensing electrical characteristics of transistors and/or light emitting elements of the sub-pixels SP, and the voltage generator 140 may generate the reference voltage.

The controller 150 may control overall operations of the display device 100. The controller 150 may receive, from the outside, input image data IMG and a control signal CTRL for controlling display thereof. The controller 150 may provide the gate control signal GCS, the data control signal DCS, and the voltage control signal VCS in response to the control signal CTRL.

The controller 150 may convert the input image data IMG to be suitable for the display device 100 or the display panel 110, thereby outputting the image data DATA. According to some embodiments, the controller 150 may align the input image data IMG to be suitable for the sub-pixels SP in units of rows, thereby outputting the image data DATA.

Two or more components among the data driver 130, the voltage generator 140, and the controller 150 may be mounted on one integrated circuit. As shown in FIG. 1, the data driver 130, the voltage generator 140, and the controller 150 may be included in a driver integrated circuit DIC. The data driver 130, the voltage generator 140, and the controller 150 may be components functionally divided in one driver integrated circuit DIC. According to some embodiments, at least one of the data driver 130, the voltage generator 140, or the controller 150 may be provided as a component distinguished from the driver integrated circuit DIC.

The display device 100 may include at least one temperature sensor 160. The temperature sensor 160 may be configured to sense a temperature at the periphery thereof and generate temperature data TEP indicating the sensed temperature. According to some embodiments, the temperature sensor 160 may be arranged to be adjacent to the display panel 110 and/or the driver integrated circuit DIC.

The controller 150 may control various operations of the display device 100 in response to the temperature data TEP. According to some embodiments, the controller 150 may adjust the luminance of an image output from the display panel 100 in response to the temperature data TEP. For example, the controller 150 may control components such as the data driver 130 and/or the voltage generator 140, thereby adjusting data signals and the first and second power voltages VDD and VSS.

Figure 2:
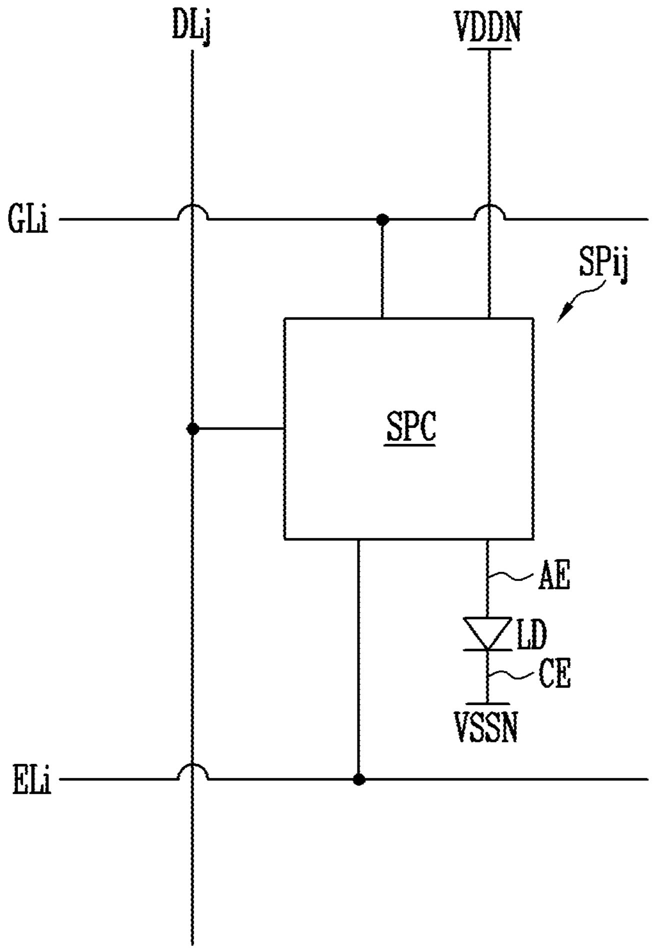
FIG. 2 is a block diagram illustrating aspects of any one of sub-pixels shown in FIG. 1 according to some embodiments.

FIG. 2 is a block diagram illustrating aspects of any one of the sub-pixels shown in FIG. 1 according to some embodiments. In FIG. 2, a sub-pixel SPij arranged on an ith row (i is an integer greater than or equal to 1 and smaller than or equal to m) and a jth column (j is an integer greater than or equal to 1 and smaller than or equal to n) among the sub-pixels SP shown in FIG. 1 is illustrated.

Referring to FIG. 2, the sub-pixel SPij may include a sub-pixel circuit SPC and a light emitting element LD.

The light emitting element LD may be connected between a first power voltage node VDDN and a second power voltage node VSSN. The first power voltage node VDDN may be a node transferring the first power voltage VDD shown in FIG. 1, and the second power voltage node VSSN may be a node transferring the second power voltage VSS shown in FIG. 1.

An anode electrode AE of the light emitting element LD may be connected to the first power voltage node VDDN through the sub-pixel circuit SPC, and a cathode electrode CE of the light emitting element LD may be connected to the second power voltage node VSSN. For example, the anode electrode AE of the light emitting element LD may be connected to the first power voltage node VDDN through one or more transistors included in the sub-pixel circuit SPC.

The sub-pixel circuit SPC may be connected to an ith gate line GLi among the first to mth gate lines GL1 to GLm shown in FIG. 1, an ith emission control line ELi among the first to mth emission control lines EL1 to ELm shown in FIG. 1, and a jth data line DLj among the first to nth data lines DL1 to DLn shown in FIG. 1. The sub-pixel circuit SPC may be configured to control the light emitting element LD according to signals received through these signal lines.

The sub-pixel circuit SPC may operate in response to a gate signal received through the ith gate line GLi. The ith gate line GLi may include one or more sub-gate lines. According to some embodiments, when the ith gate line GLi includes two or more sub-gate lines, the sub-pixel circuit SPC may operate in response to gate signals received through the corresponding sub-gate lines.

The sub-pixel circuit SPC may operate in response to an emission control signal received through the ith emission control line ELi. According to some embodiments, the ith emission control line ELi may include one or more sub-emission control lines. When the ith emission control line ELi includes two or more sub-emission control lines, the sub-pixel circuit SPC may operate in response to emission control signals receives through the corresponding emission control lines.

The sub-pixel circuit SPC may receive a data signal through the jth data line DLj. The sub-pixel circuit SPC may store a voltage corresponding to the data signal in response to at least one of the gate signals received through the sub-gate lines. The sub-pixel circuit SPC may control a current flowing from the first power voltage node VDDN to the second power voltage node VSSN through the light emitting element LD according to the stored voltage in response to the emission control signal received through the ith emission control line ELi. Accordingly, the light emitting element LD may generate light with a luminance corresponding to the data signal.

Figure 3:
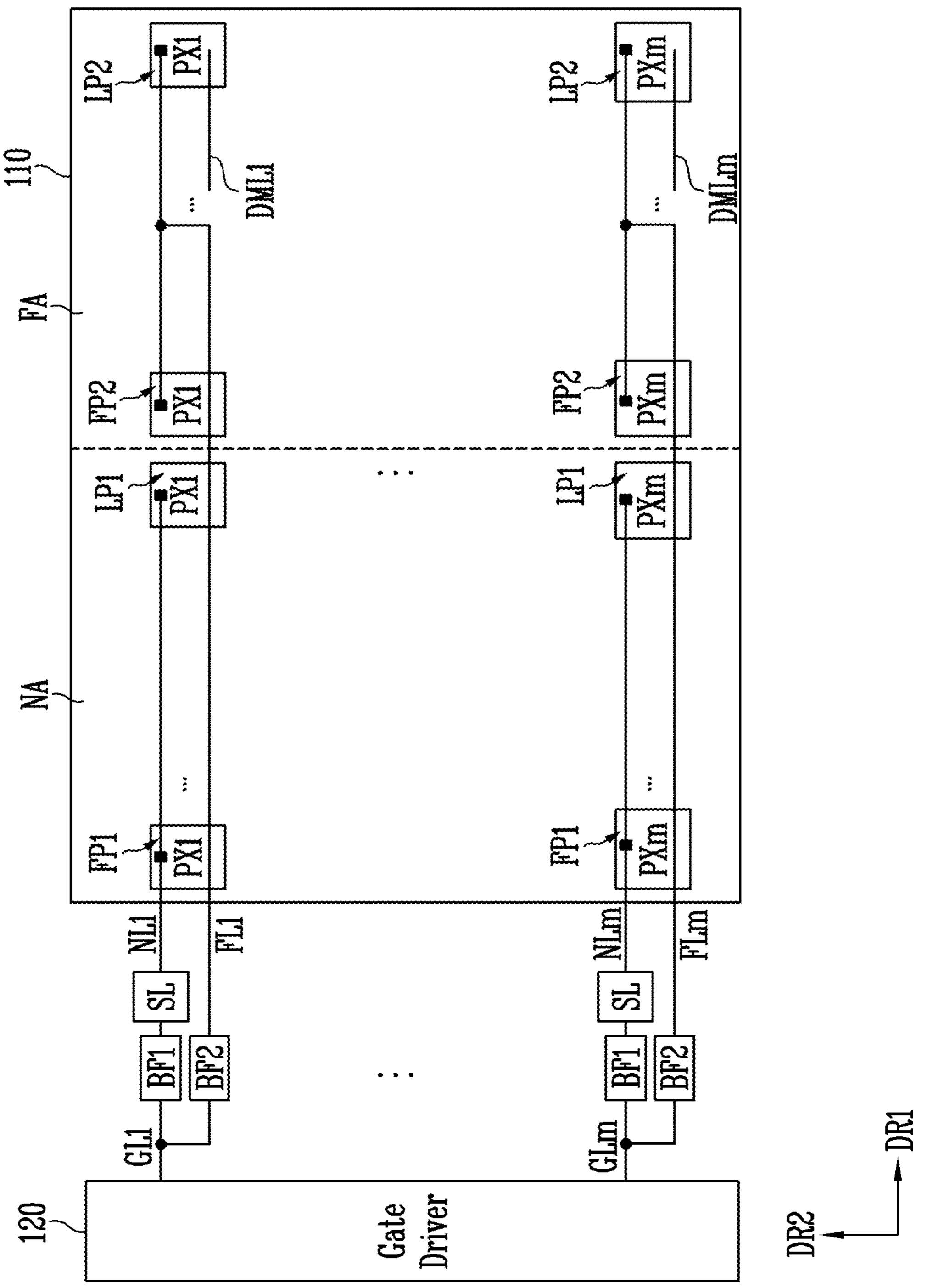
FIG. 3 is a diagram illustrating aspects of the connection relationship between a gate driver and pixels shown in FIG. 1 according to some embodiments.

FIG. 3 is a diagram illustrating aspects of the connection relationship between the gate driver and the pixels shown in FIG. 1 according to some embodiments.

Referring to FIG. 3, the pixels of the display panel 110 may be connected to separate gate lines according to distances from the gate driver 120.

The display panel 110 may be divided into a first block NA and a second block FA. The first block NA and the second block FA may be sequentially arranged in a direction distant from the gate driver 120 (a first direction DR1).

As the distances from the gate driver 120 to the pixels located in the first block NA and the second block FA increase, the resistance and parasitic capacitance of the first to mth gate lines GL1 to GLm may increase. Accordingly, a time for which a voltage of the gate signal is changed to a desired voltage level may be increased by a resistor-capacitor (RC) delay, and slew rates of the first block NA and the second block FA may be different from each other.

As the first block NA and the second block FA have the different slew rates, the image quality of the display panel 110 may be degraded. By adjusting the slew rate based on the distance between the gate driver 120 and a pixel, the image quality of the display panel 110 may be improved.

To adjust the slew rate based on the distance between the gate driver 120 and the pixel, the display device 100 may include a plurality of buffers BF and a slew rate controller SL. Each of the plurality of buffers BF may be connected to each of the first to mth gate lines GL1 to GLm. Each of the plurality of buffers BF may adjust an output time of the gate signal.

The slew rate controller SL may control the slew rate of first sub-gate lines NL1 to NLm such that the slew rate of the first block NA may be equal to the slew rate of the second block FA. The slew rate controller SL may compensate for a RC delay of the first block NA which is smaller than the second block FA. The slew rate controller SL may decrease the slew rate of the first block NA. Accordingly, the slew rate between the first block NA and the second block FA may be constant.

The first sub-gate lines NL1 to NLm may receive a gate signal from the gate driver 120 through the first buffer BF1 and the slew rate controller SL. Second sub-gate lines FL1 to FLm may receive a gate signal from the gate driver 120 through the second buffer BF2.

The pixels located in the first block NA may be connected to the first sub-gate lines NL1 to NLm, and the pixels located in the second block FA may be connected to the second sub-gate lines FL1 to FLm.

For example, based on the first direction DR1, pixels between a pixel FP1 closest to the gate driver 120 among the pixels located in the first block NA and a pixel LP1 farthest from the gate driver 120 among the pixels located in the first block NA may be connected to the first sub-gate lines NL1 to NLm.

Further, based on the first direction DR1, pixels from a pixel FP2 closest to the gate driver 120 among the pixels located in the second block FA to a pixel LP2 farthest from the gate driver 120 among the pixels located in the second block FA may be connected to the second sub-gate lines FL1 to FLm. Due to the wiring design structure, the second sub-gate lines FL1 to FLm may overlap with the first block NA, but may not be connected to the pixels located in the first block NA.

The first sub-gate lines NL1 to NLm and the second sub-gate lines FL1 to FLm may be located in the same metal layer. Also, however, the first sub gate lines NL1 to NLm and the second sub gate lines FL1 to FLm may be located in different metal layers.

In embodiments, ranges of the first block NA and the second block FA may be determined such that no luminance difference may occur between the pixel LP1 of the first block NA and the pixel FP2 of the second block FA. More specifically, the ranges of the first block NA and the second block FA may be determined such that the pixel LP1 of the first block NA and the pixel FP2 of the second block FA may have the same RC delay.

Dummy gate lines DML1 to DMLm may be located in the second block FA. For example, at points where the second sub-gate lines FL1 to FLm are first connected to the pixels of the second block FA, the dummy gate lines DML1 to DMLm may extend in a direction distant from the gate driver 120.

In embodiments, the dummy gate lines DML1 to DMLm may be placed with a margin at the points where the second sub-gate lines FL1 to FLm are first connected to the pixels of the second block FA.

As the dummy gate lines DML1 to DMLm are arranged in the second block FA, the pixels arranged in the second block FA may be connected to the first sub-gate lines NL1 to NLm and have the same pattern phenomenon as the pixels arranged in the first block NA where the second sub-gate lines FL1 to FLm are arranged.

The dummy gate lines DML1 to DMLm and the second sub-gate lines FL1 to FLm may be located on the same metal layer. According to embodiments, both ends of the dummy gate lines DML1 to DMLm may be floated, connected to a ground node, or connected to an arbitrary bias.

Figure 4:
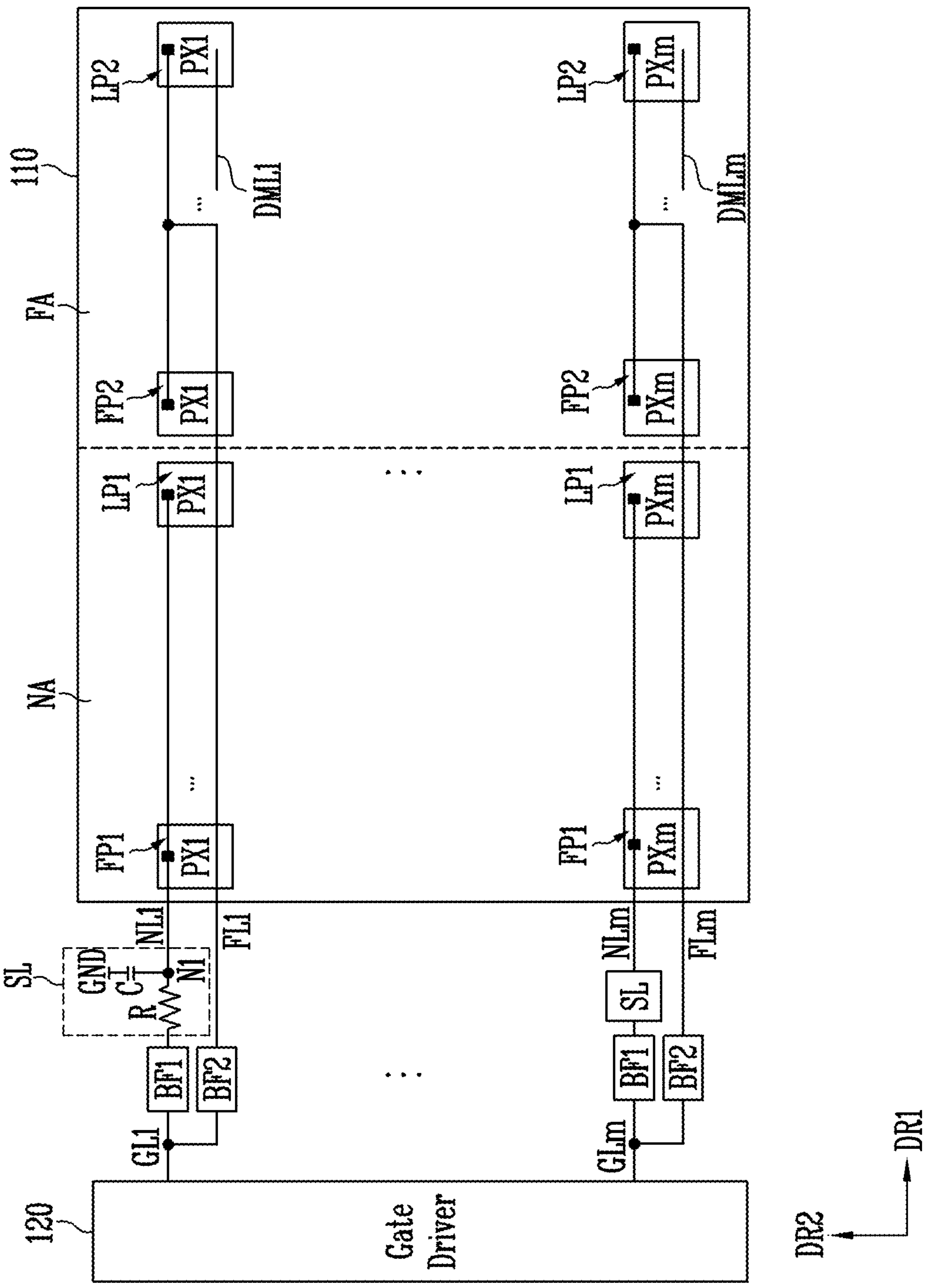
FIG. 4 is a diagram illustrating an example of a slew rate controller shown in FIG. 3.

FIG. 4 is a diagram illustrating an example of the slew rate controller SL shown in FIG. 3.

Referring to FIG. 4, the slew rate controller SL may include a resistor R and a capacitor C. The display panel 110 and the gate driver 120 as shown in FIG. 4 are similar to the display panel 110 and the gate driver 120 as shown FIG. 3. Therefore, a redundant description thereof is omitted.

The resistor R may be connected between the first buffer BF1 and the first node N1 located on first sub-gate lines NL1*a* to NLma. The capacitor C may be connected between the first node N1 and a ground node GND to which ground power is applied. However, the present disclosure is not limited thereto. The slew rate controller SL may include a plurality of resistors and a plurality of capacitors.

The resistor R may include silicide or non-silicide. The capacitor C may be configured as a metal-insulator-metal (MIM) capacitor, a metal-oxide-metal (MOM) capacitor, or a metal-oxide-semiconductor (MOS) capacitor.

Figure 5:
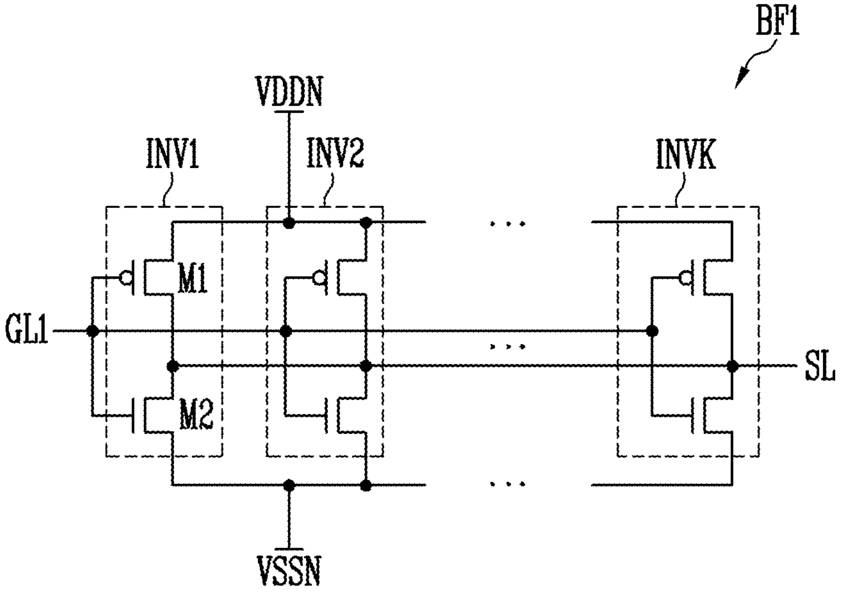
FIG. 5 is a circuit diagram illustrating aspects of a buffer shown in FIG. 3 according to some embodiments.

FIG. 5 is a circuit diagram illustrating aspects of the buffer shown in FIG. 3 according to some embodiments.

Referring to FIG. 5, the first buffer BF1 may include a plurality of inverters INV1 to INVK. Here, K may be an integer greater than or equal to 1.

Each of the plurality of inverters INV1 to INVK may include a first transistor M1 and a second transistor M2, which are connected in series. For example, the first transistor M1 may be a PMOS transistor, and the second transistor M2 may be an NMOS transistor. The first transistor M1 and the second transistor M2 may be connected to a first power voltage node VDDN and a second power voltage node VSSN.

An input terminal of each of the plurality of inverters INV1 to INVK may be connected to the first gate line GL1*a*, and an output terminal of each of the plurality of inverters INV1 to INVK may be connected to the slew rate controller SL.

Although the first buffer BF1 is illustrated in FIG. 5, the second buffer BF2 shown in FIG. 4 may have the same structure as the first buffer BF1. Referring to FIG. 3, numbers of inverters included in the first buffer BF1 and the second buffer BF2 may be the same.

However, according to some embodiments, a number of inverters included in the first buffer BF1 may be smaller than a number of inverters included in the second buffer BF2. A size of the slew rate controller SL when the number of inverters included in the first buffer BF1 may be smaller than the number of inverters included in the second buffer BF2 may be smaller than a size of the slew rate controller SL when the numbers of inverters included in the first buffer BF1 and the second buffer BF2 may be the same.

In embodiments, the size of the slew rate controller SL may be adjusted by controlling the size of the resistor and the capacitor included in the slew rate controller SL.

Figure 6:
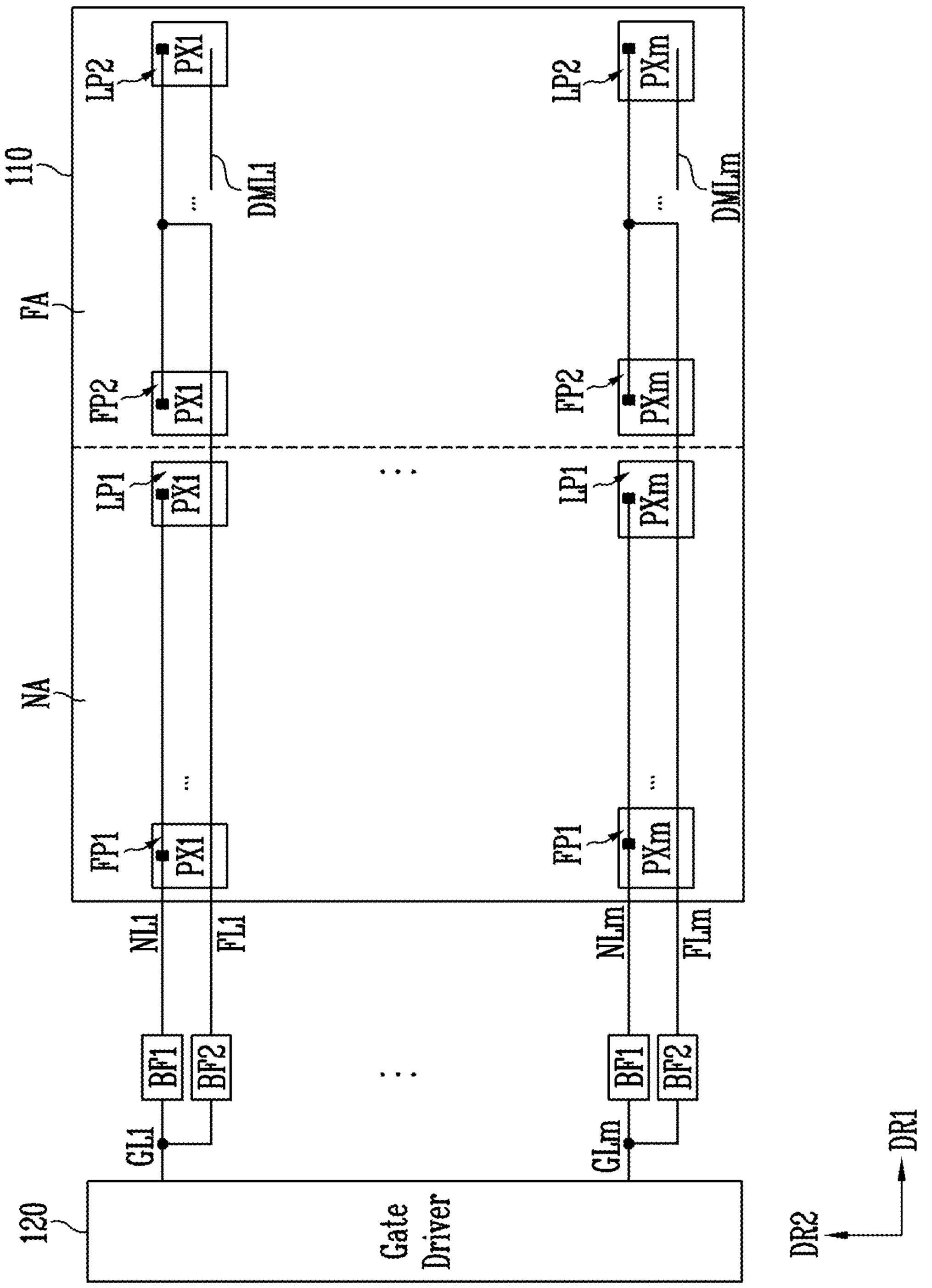
FIG. 6 is a diagram illustrating aspects of the connection relationship between a gate driver and pixels shown in FIG. 1 according to some embodiments.

FIG. 6 is a diagram illustrating aspects of the connection relationship between the gate driver and the pixels shown in FIG. 1 according to some embodiments.

Referring to FIG. 6, the pixels of the display panel 110 may be connected to separate gate lines according to distances from the gate driver 120. The connection relationship between the pixels of the display panel 110 and the gate driver 120 as shown in FIG. 6 may be similar to that shown in FIG. 3. Accordingly, redundant descriptions thereof are omitted.

The first sub-gate lines NL1 to NLm may receive a gate signal from the gate driver 120 through the first buffer BF1. The second sub-gate lines FL1 to FLm may receive a gate signal from the gate driver 120 through the second buffer BF2.

Referring to FIG. 5, the number of inverters included in the first buffer BF1 may be smaller than the number of inverters included in the second buffer BF2. The first buffer BF1 may adjust the slew rates of the first sub-gate lines NL1 to NLm such that the slew rates of the first sub-gate lines NL1 to NLm may be equal to the slew rates of the second sub-gate lines FL1 to FLm.

Figure 7:
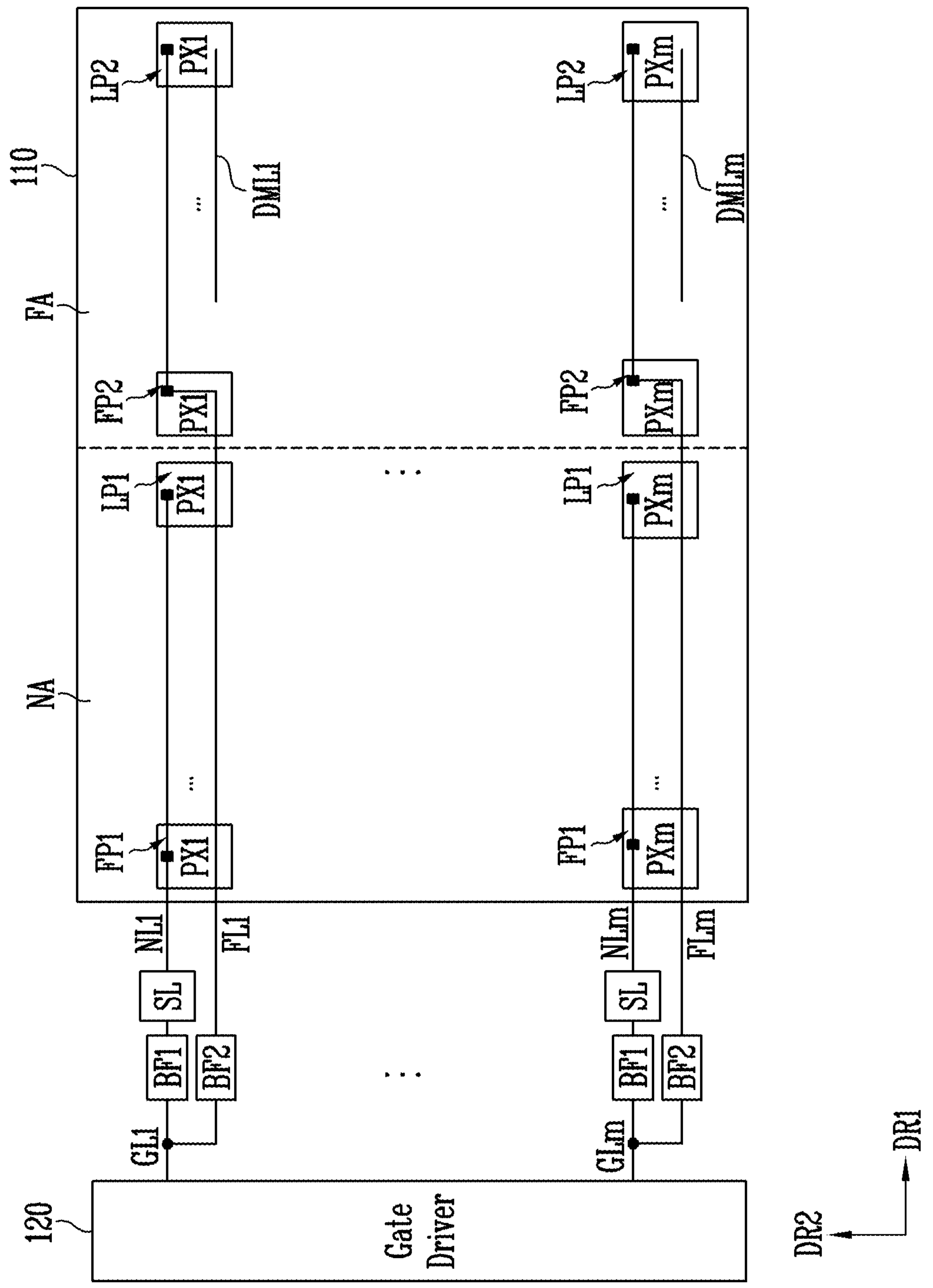
FIG. 7 is a diagram illustrating aspects of the connection relationship between a gate driver and pixels shown in FIG. 1 according to some embodiments.

FIG. 7 is a diagram illustrating aspects of the connection relationship between a gate driver and pixels shown in FIG. 1 according to some embodiments.

Referring to FIG. 7, the pixels of the display panel 110 may be connected to separate gate lines according to distances from the gate driver 120. The connection relationship between the pixels of the display panel 110 and the gate driver 120 in FIG. 7 may be similar to that shown in FIG. 3. Accordingly, a redundant description thereof is omitted.

The first sub-gate lines NL1 to NLm may receive a gate signal from the gate driver 120 through the first buffer BF1.

The second sub-gate lines FL1 to FLm may receive a gate signal from the gate driver 120 through the second buffer BF2.

Referring to FIGS. 3 and 7, the second sub-gate lines FL1 to FLm may have different arrangements In FIG. 3, the points at which the second sub-gate lines FL1 to FLm are first connected to the pixels of the second block FA may be the center point of the second block FA. That is, in FIG. 3, a scan start point of the second block FA may be the center point of the second block FA. Through the second sub-gate lines FL1 to FLm, the second block FA may be scanned starting from the center point of the second block FA to the pixel FP2 and the pixel LP2.

In FIG. 7, the points at which the second sub-gate lines FL1 to FLm are first connected to the pixels of the second block FA may be the pixel FP2, which is the closest pixel to the gate driver 120 among the pixels located in the second block FA, relative to the first direction DR1. In other words, in FIG. 7, the scan start point of the second block FA may be the pixel FP2. The second sub-gate lines FL1 to FLm may be scanned starting from the pixel FP2 to the pixel LP2.

In embodiments, the number of inverters included in each of the first buffer BF1 and the second buffer BF2 may be adjusted. The number of inverters included in the first buffer BF1 may be adjusted so as to be less than the number of inverters included in the second buffer BF2, thereby reducing the size of the slew rate controller SL or omitting the slew rate controller SL.

Figure 8:
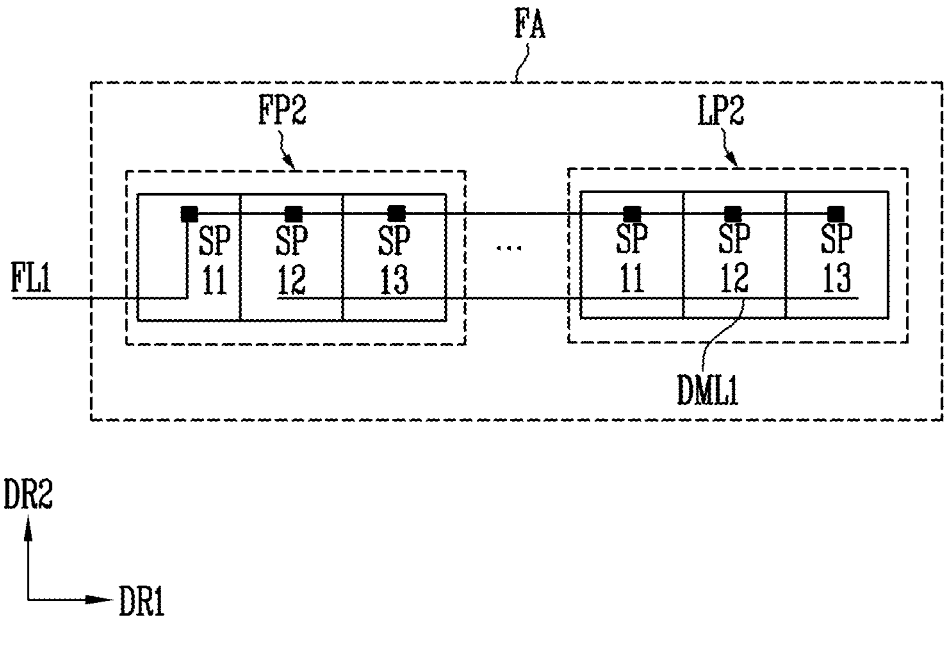
FIG. 8 is an enlarged diagram of a second block shown in FIG. 7.

FIG. 8 is an enlarged diagram of the second block FA shown in FIG. 7.

Referring to FIG. 8, the connection relationship of the pixels FP2 and LP2, the second sub-gate lines FL1, and the dummy gate line DML1 included in the second block FA are shown.

Each of the pixels FP2 and LP2 may include three sub-pixels SP11, SP12, and SP13.

The scan start point of the second block FA may be the first sub-pixel SP11 of the pixel FP2. The second sub-gate line FL1 may be scanned starting from the first sub-pixel SP11 of the pixel FP2 to the third sub-pixel SP13 of the pixel LP2.

The dummy gate line DML1 may extend in a direction (DR1) distant from the gate driver 120 from the first sub-pixel SP11 of the pixel FP2 where the second sub-gate line FL1 is first connected to the pixels of the second block FA.

In embodiments, the dummy gate line DML1 may be arranged with a margin at the point where the dummy gate line DML1 is first connected to the pixels of the second block FA.

Referring to FIG. 8, the dummy gate line DML1 may extend from the first sub-pixel SP11 of the pixel FP2 to the second sub-pixel SP12 of the pixel FP2 with a margin.

Figure 9:
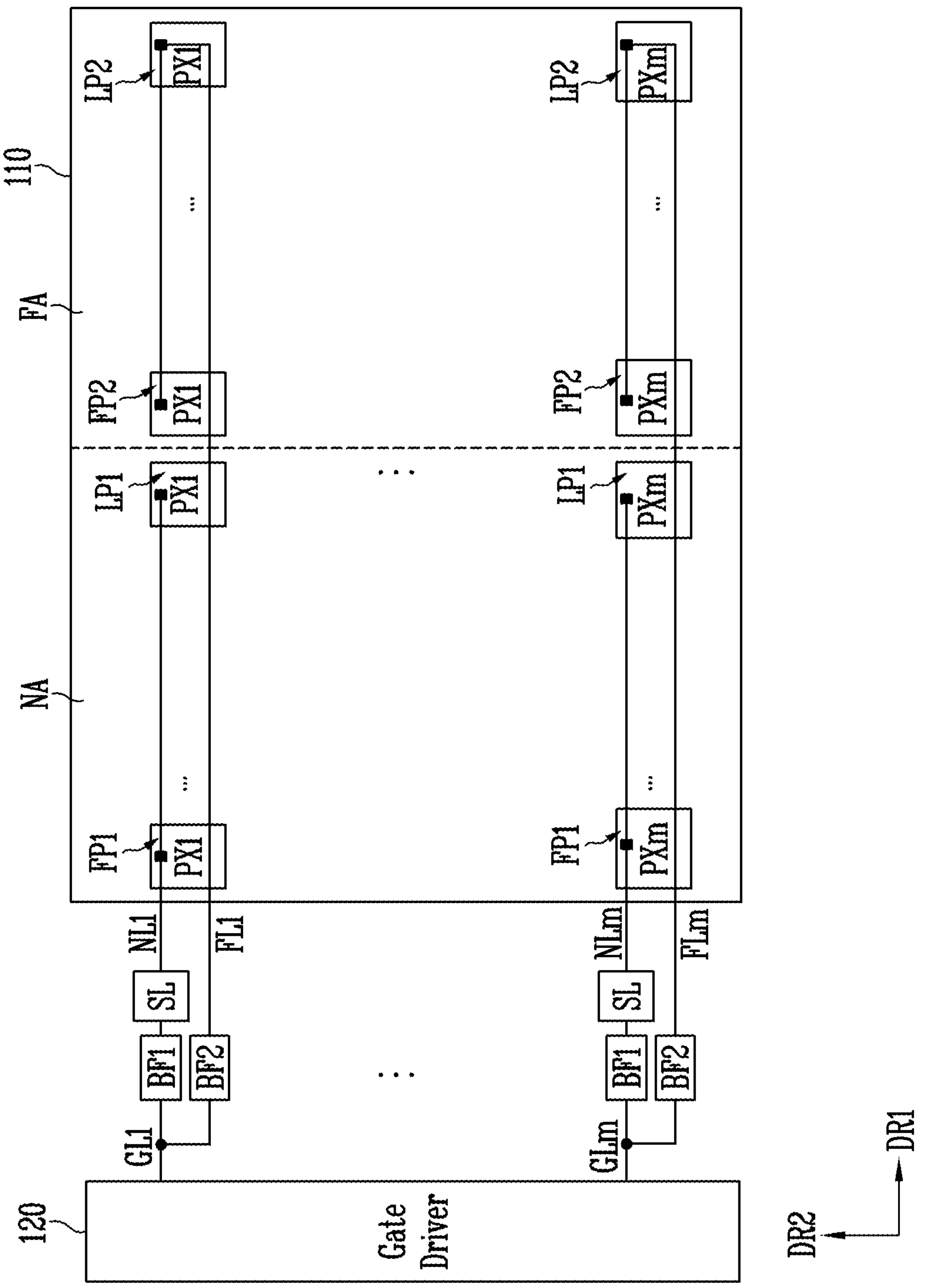
FIG. 9 is a diagram illustrating aspects of the connection relationship between a gate driver and pixels shown in in FIG. 1 according to some embodiments.

FIG. 9 is a diagram illustrating aspects of the connection relationship between a gate driver and pixels shown in FIG. 1 according to some embodiments.

Referring to FIG. 9, the pixels of the display panel 110 may be connected to separate gate lines according to distances from the gate driver 120. The connection relationship between the pixels of the display panel 110 and the gate driver 120 in FIG. 9 may be similar to that shown in FIG. 3. Accordingly, a redundant description thereof is omitted.

The first sub-gate lines NL1 to NLm may receive a gate signal from the gate driver 120 through the first buffer BF1 and the slew rate controller SL. The second sub-gate lines FL1 to FLm may receive a gate signal from the gate driver 120 through the second buffer BF2.

Referring to FIGS. 3 and 9, the second sub-gate lines FL1 to FLm may have different arrangements In FIG. 9, the points at which the second sub-gate lines FL1 to FLm are first connected to the pixels of the second block FA may be the pixel LP2, which is the farthest pixel from the gate driver 120 among the pixels located in the second block FA, relative to the first direction DR1. In other words, in FIG. 9, the scan start point of the second block FA may be the pixel LP2. The second sub-gate lines FL1 to FLm may be scanned starting with the pixel LP2 to the pixel FP2.

Unlike the embodiments shown in FIGS. 3 and 7, the embodiments disclosed in FIG. 9 may not include the dummy gate lines.

In embodiments, the number of inverters included in the first buffer BF1 and the second buffer BF2 may be adjusted. The number of inverters included in the first buffer BF1 may be adjusted so as to be less than the number of inverters included in the second buffer BF2, thereby reducing the size of the slew rate controller SL or omitting the slew rate controller SL.

Figure 10:
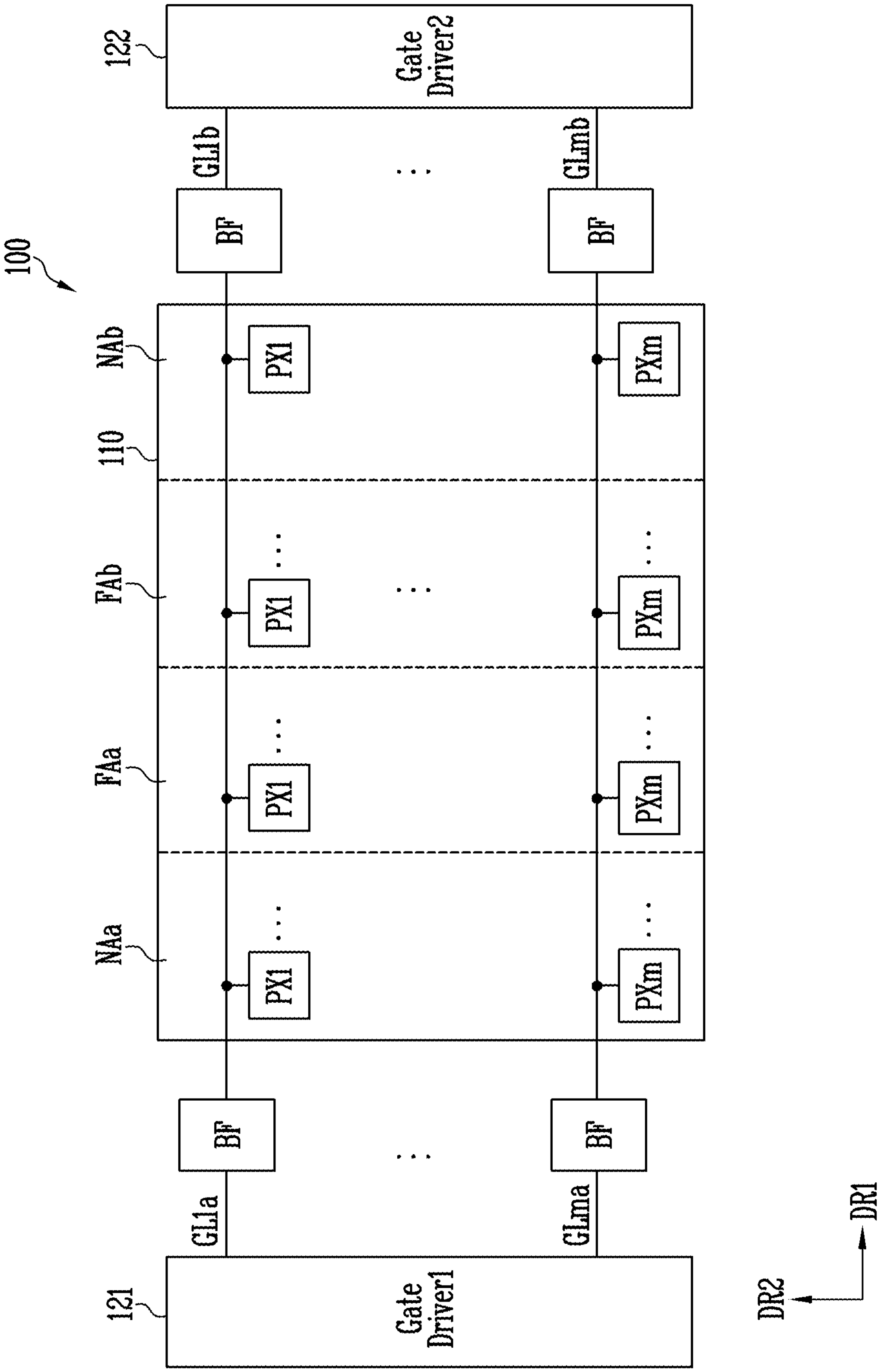
FIG. 10 is a diagram illustrating aspects of a gate driver included in a display device shown in FIG. 1 according to some embodiments.

FIG. 10 is a diagram illustrating aspects of the gate driver 120 included in the display device shown in FIG. 1 according to some embodiments.

Referring to FIG. 10, the gate driver 120 may include a first gate driver 121 and a second gate driver 122. For simplification of the drawing, some components that are not necessary to enable a person having ordinary skill in the art to make, use, and understand embodiments according to the present disclosure may be omitted so as to clarify the description of the present disclosure.

The first gate driver 121 may be located at a first side of the display panel 110. The second gate driver 122 may be located at a second side of the display panel 110. According to some embodiments, the first and second gate drivers 121 and 122 may be arranged to be spaced apart from each other with the display panel 110 interposed therebetween.

A gate signal generated by the first gate driver 121 may be provided to some pixels through first to mth gate lines GL1*a* to GL1*ma*, and a gate signal generated by the second gate driver 121 may be provided to some pixels through first to mth gate lines GL1*b* to GLmb.

Each of the first to mth gate lines GL1*a* to GL1*ma* and each of the first to mth gate lines GL1*b* to GLmb may be connected to the same pixel row. For example, the first gate line GL1*a* and the first gate line GL1*b* may be connected to a first pixel row. The mth gate line GLma and the mth gate line GLmb may be connected to an mth pixel row.

In addition, the display device 100 may include a plurality of buffers BF. The plurality of buffers BF may be connected to the first to mth gate lines GL1*a* to GL1*ma* and the first to mth gate lines GL1*b* to GLmb, respectively. Each of the plurality of buffers BF may adjust an output time of the gate signal.

The display panel 110 may be divided into a first block NAa, a second block FAa, a third block NAb, and a fourth block FAb. The first block NAa, the second block FAa, the fourth block FAb, and the third block Nab may be sequentially arranged in a direction (e.g., a first direction DR1) distant from the first gate driver 121. The third block NAb, the fourth block FAb, the second block FAa, and the first block NAa may be sequentially arranged in a direction (e.g., the opposite direction of the first direction DR1) distant from the second gate driver 122.

According to some embodiments, a pixel located in the first block NAa and the second block FAa may receive the gate signal from the first gate driver 121. A pixel located in the third block NAb and the fourth block FAb may receive the gate signal from the second gate driver 122.

As a distance from the first gate driver 121 to the pixel located in the first block NAa and the second block FAa increases, resistances and parasitic capacitances of the first to mth gate lines GL1*a* to GLma may increase. Accordingly, a time for which a voltage of the gate signal is changed to a desired voltage level may be increased by a resistor-capacitor (RC) delay, and slew rates of the first block NAa and the second block FAa may be different from each other.

Similarly, as a distance from the second gate driver 122 to the pixel located in the third block NAb and the fourth block FAb increases, resistances and parasitic capacitances of the first to mth gate lines GL1*b* to GLmb may increase. Accordingly, a time for which a voltage of the gate signal is changed to a desired voltage level may be increased by an RC delay, and slew rates of the third block NAb and the fourth block FAb may be different from each other.

As slew rates of the first block NAa, the second block FAa, the third block NAb, and the fourth block FAb are different from one another, the image quality of the display panel 110 may be deteriorated. As slew rates are controlled according to distances between the first and second gate drivers 121 and 122 and a pixel, the image quality of the display panel 110 can be relatively improved. This will be described in detail later with reference to FIGS. 11 to 15.

Figure 11:
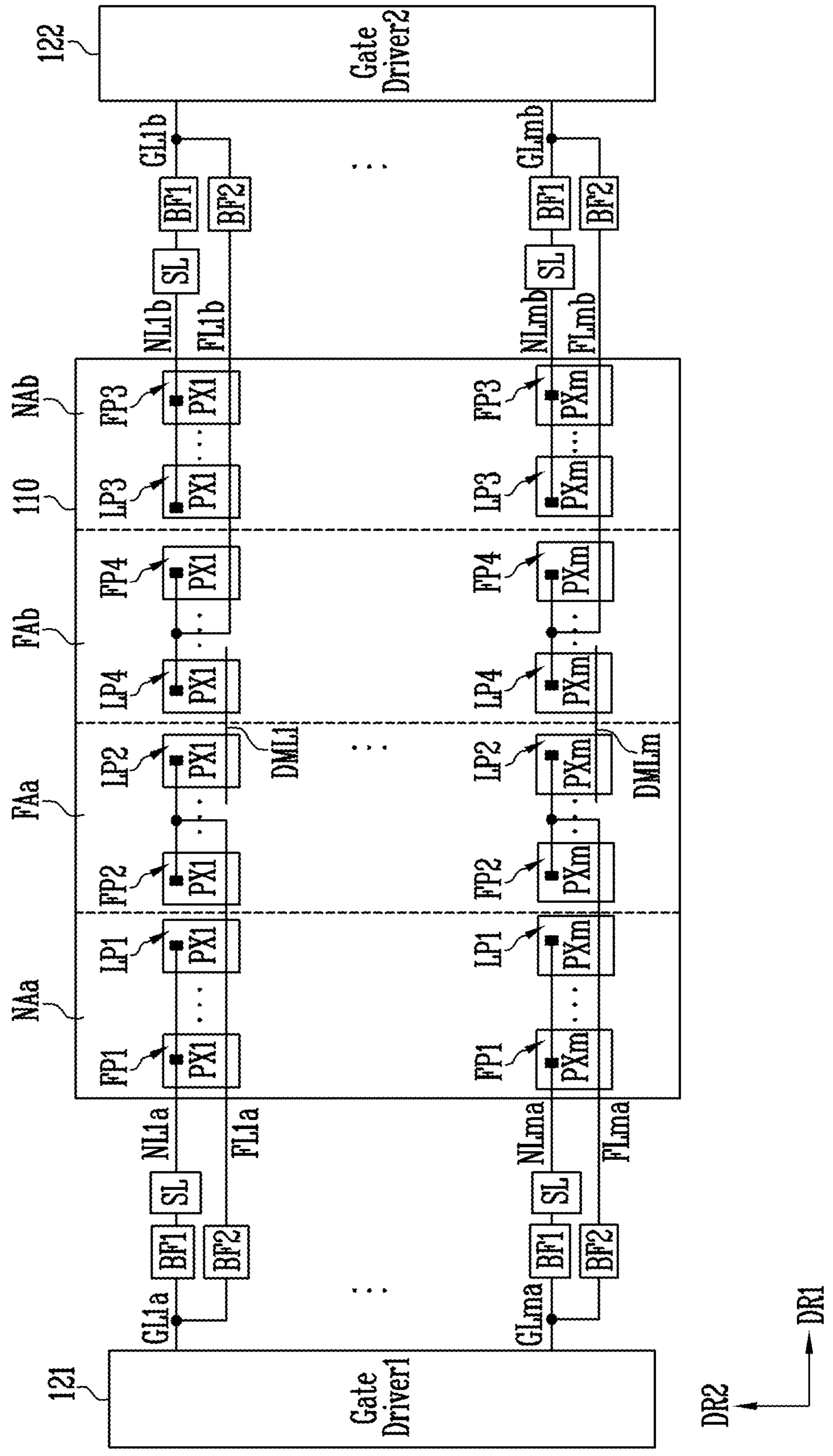
FIG. 11 is a diagram illustrating aspects of the connection relationship between first and second gate drivers and pixels shown in FIG. 10 according to some embodiments.

FIG. 11 is a diagram illustrating aspects of the connection relationship between the first and second gate drivers and the pixels shown in FIG. 10 according to some embodiments.

Referring to FIG. 11, a separate gate line may be connected according to distances from the first and second gate drivers 121 and 122.

Pixels located in the first block NAa may be connected to first sub-gate lines NL1*a* to NLma, and pixels located in the second block FAa may be connected to second sub-gate lines FL1*a* to FLma.

For example, with respect to the first direction DR1, pixels from a pixel FP1 closest to the first gate driver 121 among the pixels located in the first block NAa to a pixel LP1 most distant from the first gate driver 121 among the pixels located in the first block NAa may be connected to the first sub-gate lines NL1*a* to NLma.

In addition, with respect to the first direction DR1, pixels from a pixel FP2 closest to the first gate driver 121 among the pixels located in the second block FAa to a pixel LP2 most distant from the first gate driver 121 among the pixels located in the second block FAa may be connected to the second sub-gate lines FL1*a* to FLma. Because of a line design structure, the second sub-gate lines FL1*a* to FLma overlap with the first block NAa, but may not be connected to the pixels located in the first block NAa.

The first sub-gate lines NL1*a* to NLma may receive the gate signal from the first gate driver 121 through a first buffer BF1 and a slew rate controller SL. The second sub-gate lines FL1*a* to FLma may receive the gate signal from the first gate driver 121 through a second buffer BF2.

The slew rate controller SL may control slew rates of the first sub-gate lines NL1*a* to NLma such that a slew rate of the first block NAa is equal to a slew rate of the second block FAa. The slew rate controller SL may compensate for a resistor-capacitor (RC) delay of the first block NAa, which is smaller than an RC delay of the second block FAa. The slew rate controller SL may decrease the slew rate of the first block NAa. Accordingly, the slew rates of the first block NAa and the second block FAa may become constant.

Similarly, pixels located in the third block NAb may be connected to first sub-gate lines NL1*b* to NLmb, and pixels located in the fourth block FAb may be connected to second sub-gate lines FL1*b* to FLmb.

The first sub-gate lines NL1*b* to NLmb may receive the gate signal from the second gate driver 122 through a first buffer BF1 and a slew rate controller SL. The second sub-gate lines FL1*b* to FLmb may receive the gate signal from the second driver 122 through a second buffer BF2.

The slew rate controller SL may control slew rates of the first sub-gate lines NL1*b* to NLmb such that a slew rate of the third block NAb is equal to a slew rate of the fourth block FAb. The slew rate controller SL may compensate for an RC delay of the third block NAb, which is smaller than an RC delay of the fourth block FAb. The slew rate controller SL may decrease the slew rate of the third block NAb. Accordingly, the slew rates of the third block NAb and the fourth block FAb may become constant.

The first sub-gate lines NL1*a* to NLma and NL1*b* to NLmb and the second sub-gate lines FL1*a* to FLma and FL1*b* to FLmb may be located in the same metal layer. Also, the first sub-gate lines NL1*a* to NLma and NL1*b* to NLmb and the second sub-gate lines FL1*a* to FLma and FL1*b* to FLmb may be located on different metal layers.

According to some embodiments, ranges of the first block NAa and the second block FAa may be determined such that no luminance different occurs between the pixel LP1 of the first block NAa and the pixel FP2 of the second block FAa. For example, the pixel LP1 of the first block NAa and the pixel FP2 of the second block FAa may have the same RC delay.

Similarly, ranges of the third block NAb and the fourth block FAb may be determined such that no luminance different occurs between a pixel LP3 of the third block NAb and a pixel FP4 of the fourth block FAb. For example, the pixel LP3 of the third block NAb and the pixel FP4 of the fourth block FAb may have the same RC delay. That is, slew rates of the gate signal provided to the pixel LP3 of the third block NAb and the pixel FP4 of the fourth block FAb may be the same.

Dummy gate lines DML1 to DMLm may be located in the second block FAa and the fourth block FAb. For example, the dummy gate lines DML1 to DMLm may be located in the pixel LP2 of the second block FAa and a pixel LP4 of the fourth block FAb.

At points at which the second sub-gate lines FL1*a* to FLma are connected to the pixels of the second block FAa for the first time, the dummy gate lines DML1 to DMLm may extend in a direction distant from the first gate driver 121. Alternatively, at points at which the second sub-gate lines FL1*b* to FLmb are connected to the pixels of the fourth block FAb for the first time, the dummy gate lines DML1 to DMLm may extend in a direction distant from the second gate driver 122.

According to some embodiments, the dummy gate lines DML1 to DMLm may be arranged with a margin at the points at which the second sub-gate lines FL1*a* to FLma and FL1*b* to FLmb are connected to the pixels of the second block FAa and the fourth block FAb for the first time.

As the dummy gate lines DML1 to DMLm are located in the second block FAa and the fourth block FAb, the pixels of the second block FAa and the fourth block FAb may have the same pattern shape as the pixels located in the first block NAa and the third block NAb, which are connected to the first sub-gate lines NL1*a* to NLma and NL1*b* to NLmb and have the second sub-gate lines FL1*a* to FLma and FL1*b* to FLmb located therein.

The dummy gate lines DML1 to DMLm and the second sub-gate lines FL1*a* to FLma and FL1*b* to FLmb may be located in the same metal layer. According to some embodiments, both ends of the dummy gate lines DML1 to DMLm may be floated, be connected to a ground node, or be connected to an arbitrary bias.

Figure 12:
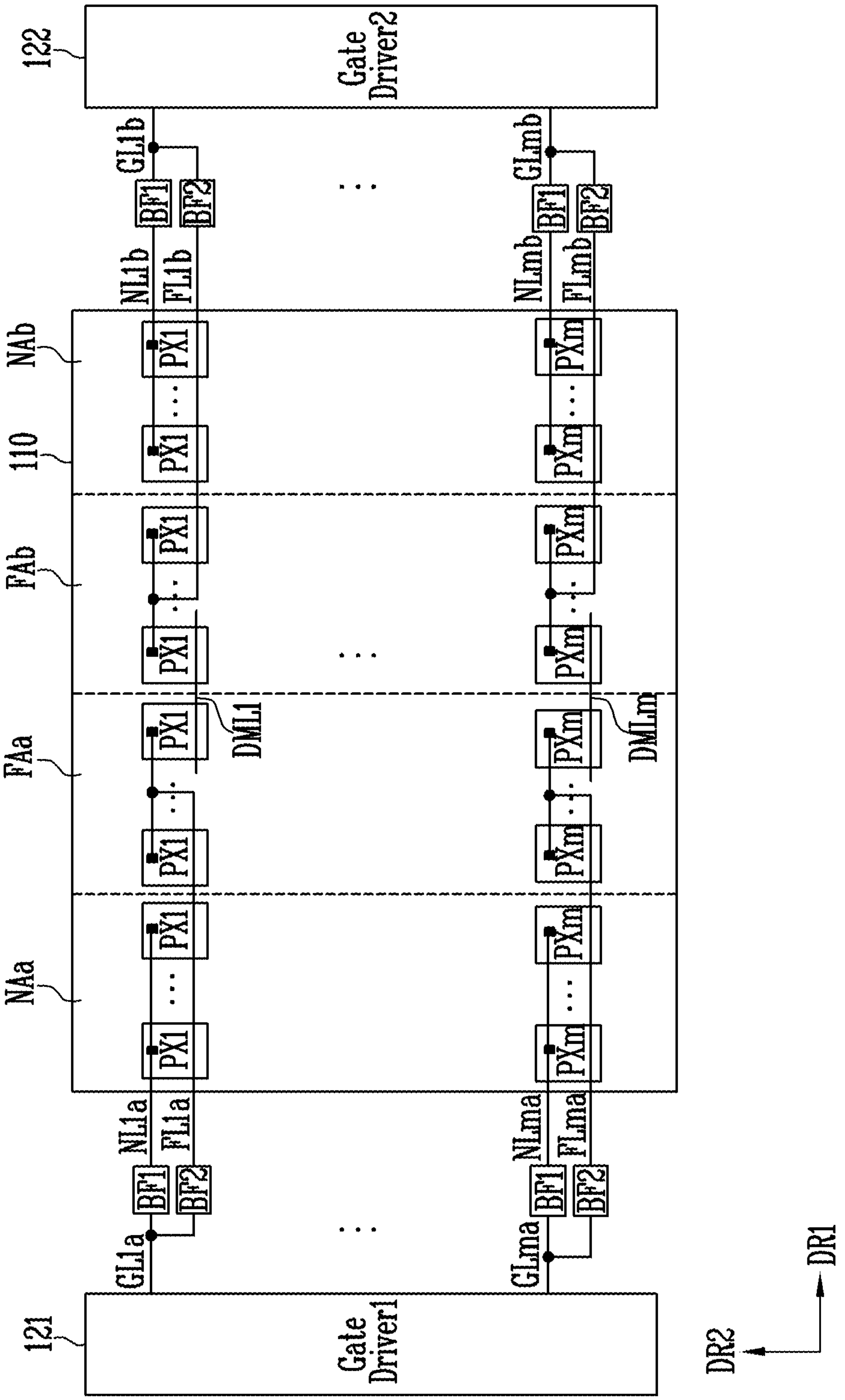
FIG. 12 is a diagram illustrating aspects of the connection relationship between first and second gate drivers and pixels shown in FIG. 10 according to some embodiments.

FIG. 12 is a diagram illustrating aspects of the connection relationship between the first and second gate drivers and the pixels shown in FIG. 10 according to some embodiments.

Referring to FIG. 12, a separate gate line may be connected to pixels of the display panel 110 according to distances from the first and second gate drivers 121 and 122. A connection relationship of the pixels of the display panel 110 and the first and second gate drivers 121 and 122, shown in FIG. 12, may be similar to the connection relationship shown in FIG. 11. Therefore, some overlapping descriptions may be omitted.

First sub-gate lines NL1*a* to NLma may receive the gate signal from the first gate driver 121 through a first buffer BF1. Second sub-gate lines FL1*a* to FLma may receive the gate signal from the first gate driver 121 through a second buffer BF2.

Referring to FIGS. 5 and 12, a number of inverters included in the first buffer BF1 may be smaller than a number of inverters included in the second buffer BF2. The first buffer BF1 may control a slew rate of the first sub-gate lines NL1*a* to NLma such that the slew rate of the first sub-gate lines NL1*a* to NLma is equal to a slew rate of the second sub-gate lines FL1*a* to FLma.

Figure 13:
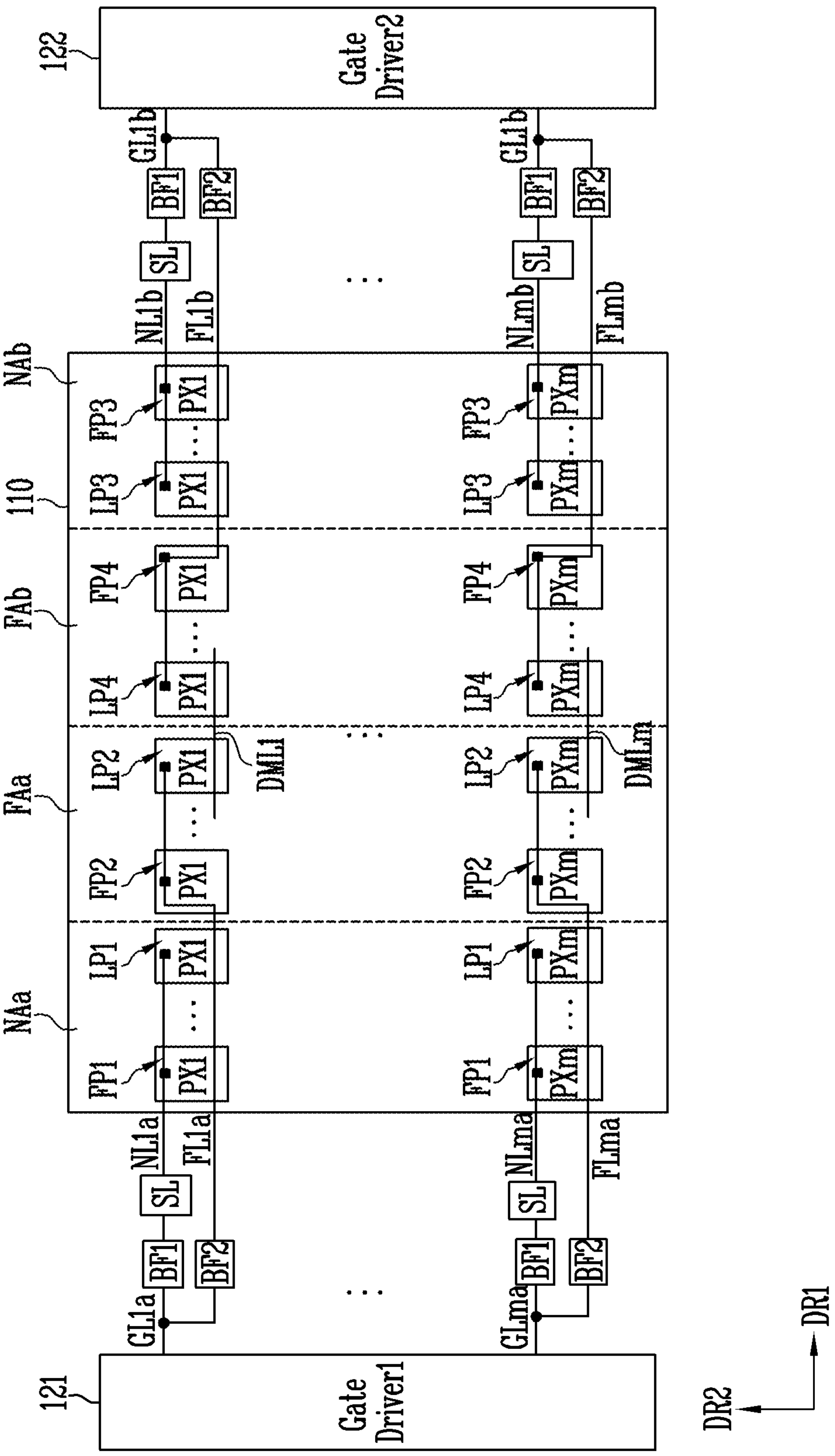
FIG. 13 is a diagram illustrating aspects of the connection relationship between the first and second gate drivers and pixels shown in FIG. 10 according to some embodiments.

FIG. 13 is a diagram illustrating aspects of the connection relationship between the first and second gate drivers and the pixels shown in FIG. 10 according to some embodiments.

Referring to FIG. 13, a separate gate line may be connected to pixels of the display panel 110 according to distances from the first and second gate drivers 121 and 122. A connection relationship of the pixels of the display panel 110 and the first and second gate drivers 121 and 122, shown in FIG. 13, may be similar to the connection relationship shown in FIG. 11. Therefore, some overlapping descriptions may be omitted.

First sub-gate lines NL1*a* to NLma may receive the gate signal from the first gate driver 121 through a first buffer BF1 and a slew rate controller SL. Second sub-gate lines FL1*a* to FLma may receive the gate signal from the first gate driver 121 through a second buffer BF2.

Referring to FIGS. 11 and 13, the arrangement form of the second sub-gate lines FL1*a* to FLma shown in FIG. 4 and an arrangement form of the second sub-gate lines FL1*a* to FLma shown in FIG. 8 may be different from each other.

In FIG. 11, each of the points at which the second sub-gate lines FL1*a* to FLma are connected to the pixels of the second block FAa for the first time may be a middle point of the second block FAa. That is, in FIG. 11, a scan start point of the second block FAa may be a middle point of the second block FAa. Through the second sub-gate lines FL1*a* to FLma, pixels may be scanned up to a pixel FP2 and a pixel LP2, starting with the middle point of the second block FAa.

In FIG. 13, each of points at which the second sub-gate lines FL1*a* to FLma are connected to the pixels of the second block FAa for the first time may be a pixel FP2 closest to the first gate driver 121 among the pixels located in the second block FAa with respect to the first direction DR1. That is, in FIG. 13, a scan start point of the second block FAa may be the pixel FP2. Through the second sub-gate lines FL1*a* to FLma, pixels may be scanned up to a pixel LP2, starting with a pixel FP2.

According to some embodiments, numbers of inverters included in the first buffer BF1 and the second buffer BF2 may be adjusted. A number of inverters included in the first buffer BF1 may be adjusted to be smaller than a number of inverters included in the second buffer BF2, thereby decreasing the size of the slew rate controller SL or omitting the slew rate controller SL.

Figure 14:
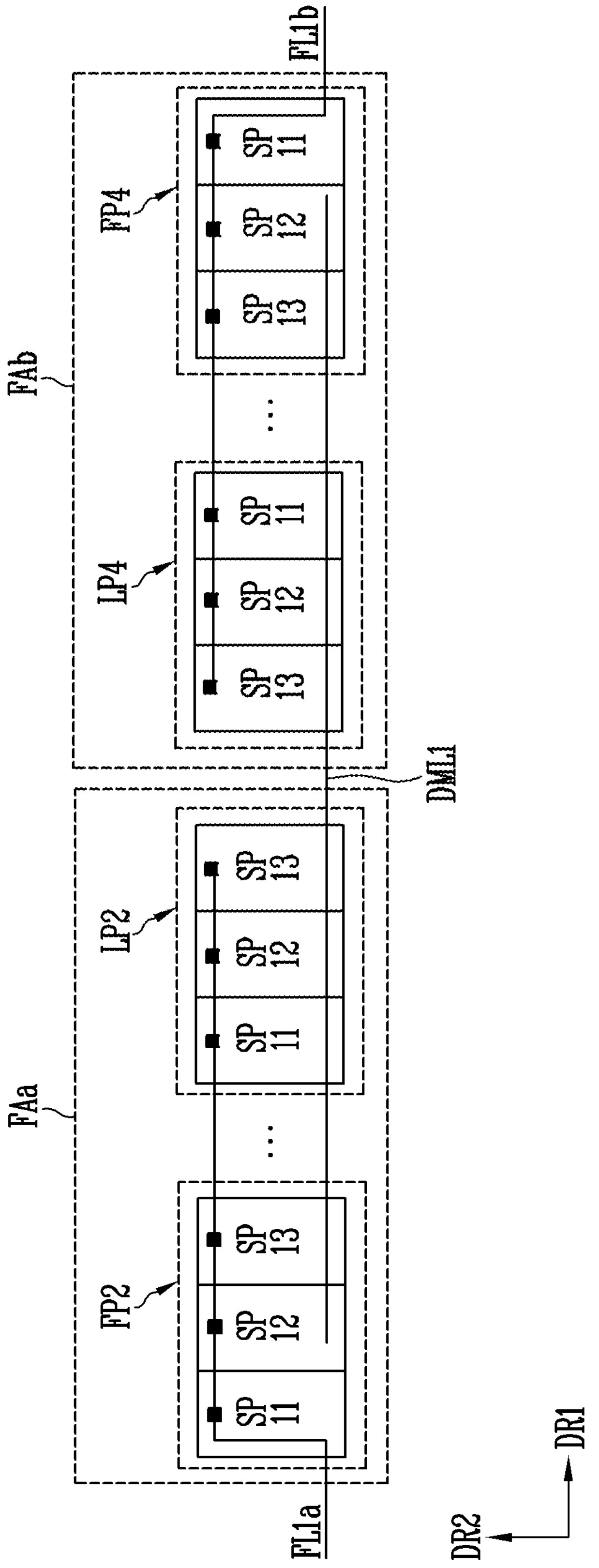
FIG. 14 is an enlarged view of a second block and a fourth block shown in FIG. 13.

FIG. 14 is an enlarged view of the second block FAa and the fourth block FAb shown in FIG. 13.

Referring to FIG. 14, a connection relationship of pixels FP2, LP2, LP4, and FP4, second sub-gate lines FL1*a* and FL1*b*, and a dummy gate line DML1, which are included in the second block FAa and the fourth block FAb, is illustrated.

Each of the pixels FP2, LP2, LP4, and FP4 may include three sub-pixels SP11, SP12, and SP13.

A scan start point of the second block FAa may be a first sub-pixel SP11 of the pixel FP2. Through the second sub-gate line FL1*a*, pixels may be scanned up to a third sub-pixel SP13 of the pixel LP2, starting with the first sub-pixel SP11 of the pixel FP2.

Similarly, a scan start point of the fourth block FAb may be a first sub-pixel SP11 of the pixel FP4. Through the second sub-gate line FL1*b*, pixels may be scanned up to a third sub-pixel SP13 of the pixel LP4, starting with the first sub-pixel SP11 of the pixel FP4.

In the first sub-pixel SP11 of the pixel FP4 to which the second sub-gate line FL1*a* is connected among the pixels of the second block FAa for the first time, the dummy gate line DML1 may extend in the direction (e.g., the first direction DR1) distant from the first gate driver 121. Alternatively, in the first sub-pixel SP11 of the pixel FP4 to which the second sub-gate line FL1*b* is connected among the pixels of the fourth block FAb for the first time, the dummy gate line DML1 may extend in a direction (e.g., the opposite direction of the first direction DR1) distant from the second gate driver 122.

According to some embodiments, the dummy gate line DML1 may be arranged with a margin at points at which the second sub-gate line FL1*a* is connected to the pixels of the second block FAa for the first time. Referring to FIG. 14, the dummy gate line DML1 may extend from a second sub-pixel SP12 having a margin in the first sub-pixel SP11 of the pixel FP2. Similarly, the dummy gate line DML1 may extend from a second sub-pixel SP12 having a margin in the first sub-pixel SP11 of the pixel FP4.

Figure 15:
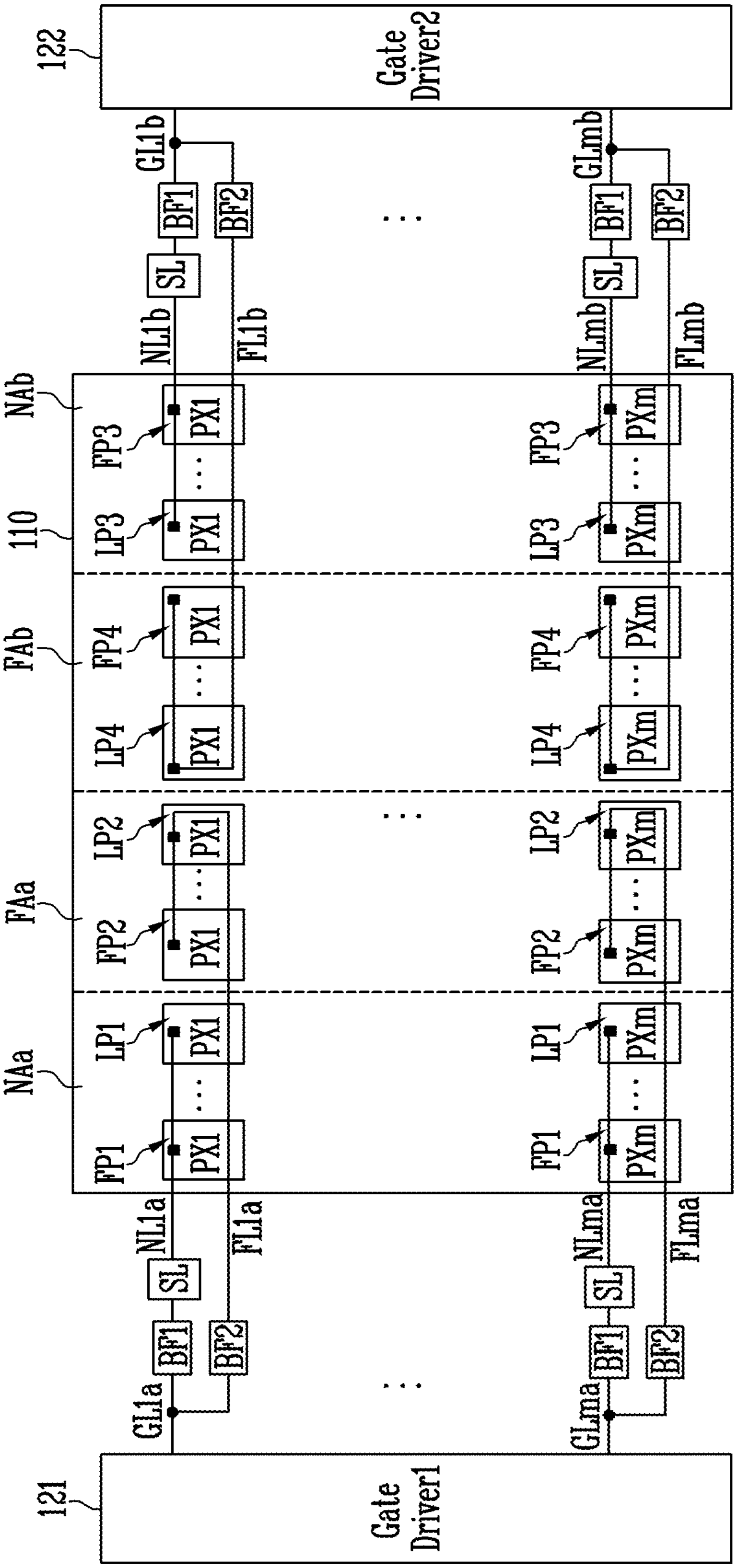
FIG. 15 is a diagram illustrating aspects of the connection relationship between first and second gate drivers and pixels shown in FIG. 10 according to some embodiments.

FIG. 15 is a diagram illustrating aspects of the connection relationship between the first and second gate drivers and the pixels shown in FIG. 10 according to some embodiments.

Referring to FIG. 15, a separate gate line may be connected to pixels of the display panel 110 according to distances from the first and second gate drivers 121 and 122. A connection relationship of the pixels of the display panel 110 and the first and second gate drivers 121 and 122, shown in FIG. 15, may be similar to the connection relationship shown in FIG. 11. Therefore, some overlapping descriptions may be omitted.

First sub-gate lines NL1*a* to NLma may receive the gate signal from the first gate driver 121 through a first buffer BF1 and a slew rate controller SL. Second sub-gate lines FL1*a* to FLma may receive the gate signal from the first gate driver 121 through a second buffer BF2.

Referring to FIGS. 11 and 15, the arrangement form of the second sub-gate lines FL1*a* to FLma shown in FIG. 4 and an arrangement form of the second sub-gate lines FL1*a* to FLma shown in FIG. 10 may be different from each other.

In FIG. 15, each of points at which the second sub-gate lines FL1*a* to FLma are connected to the pixels of the second block FAa for the first time may be a pixel LP2 most distant from the first gate driver 121 among the pixels located in the second block FAa with respect to the first direction. That is, in FIG. 15, a scan start point of the second block FAa may be the pixel LP2. Through the second sub-gate lines FL1*a* to FLma, pixels may be scanned up to a pixel FP2, starting with the pixel LP2.

Similarly, in FIG. 15, each of points at which the second sub-gate lines FL1*b* to FLmb are connected to the pixels of the second block FAa for the first time may be a pixel LP4 most distant from the second gate driver 122 among the pixels located in the fourth block FAb with respect to the opposite direction of the first direction DR1. That is, in FIG. 10, a scan start point of the fourth block FAb may be the pixel LP4. Through the second sub-gate lines FL1*b* to FLmb, pixels may be scanned up to a pixel FP4, starting with the pixel LP4.

Unlike the embodiments shown in FIGS. 11 and 13, the embodiments shown in FIG. 15 may not include the dummy gate line.

According to some embodiments, numbers of inverters included in the first buffer BF1 and the second buffer BF2 may be adjusted. A number of inverters included in the first buffer BF1 may be adjusted to be smaller than a number of inverters included in the second buffer BF2, thereby decreasing the size of the slew rate controller SL or omitting the slew rate controller SL.

Figure 16:
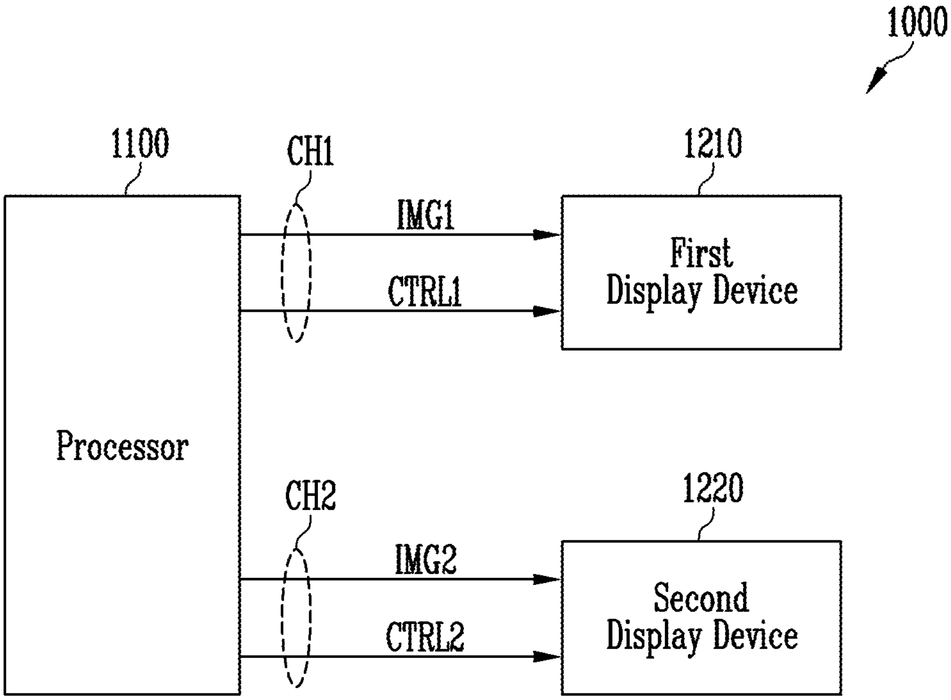
FIG. 16 is a block diagram illustrating aspects of a display system according to some embodiments.

FIG. 16 is a block diagram illustrating aspects of a display system according to some embodiments.

Referring to FIG. 16, a display system 1000 may include a processor 1100 and one or more display devices 1210 and 1220.

The processor 1100 may perform various tasks and various calculations. In embodiments, the processor 1100 may include an Application Processor (AP), a Graphics Processing Unit (GPU), a microprocessor, a Central Processing Unit (CPU), and the like. The processor 1100 may be connected to other components of the display system 1000 through a bus system to control the components of the display system 1000.

In FIG. 16, it is illustrated that the display system 1000 includes first and second display devices 1210 and 1220. The processor 1100 may be connected to the first display device 1210 through a first channel CH1, and be connected to the second display device 1220 through a second channel CH2.

Through the first channel CH1, the processor 1100 may transmit first image data IMG1 and a first control signal CTRL1 to the first display device 1210. The first display device 1210 may display an image, based on the first image data IMG1 and the first control signal CTRL1. The first display device 1210 may be configured identically to the display device 100 described with reference to FIG. 1. The first image data IMG1 and the first control signal CTRL1 may be provided as the input image data IMG and the control signal CTRL, which are shown in FIG. 1, respectively.

Through the second channel CH2, the processor 1100 may transmit second image data IMG2 and a second control signal CTRL2 to the second display device 1220. The second display device 1220 may display an image, based on the second image data IMG2 and the second control signal CTRL2. The second display device 1220 may be configured identically to the display device 100 described with reference to FIG. 1. The second image data IMG2 and the second control signal CTRL2 may be provided as the input image data IMG and the control signal CTRL, which are shown in FIG. 1, respectively.

The display system 1000 may include a computing system for providing an image display function, such as a portable computer, a mobile phone, a smartphone, a tablet personal computer (PC), a smart watch, a watch phone, a portable multimedia player (PMP), a navigation system, or an ultra mobile computer (UMPC). Also, the display system 1000 may include at least one of a head mounted display (HMD) device, a virtual reality (VR) device, a mixed reality (MR) device, or an augmented reality (AR) device.

Figure 17:
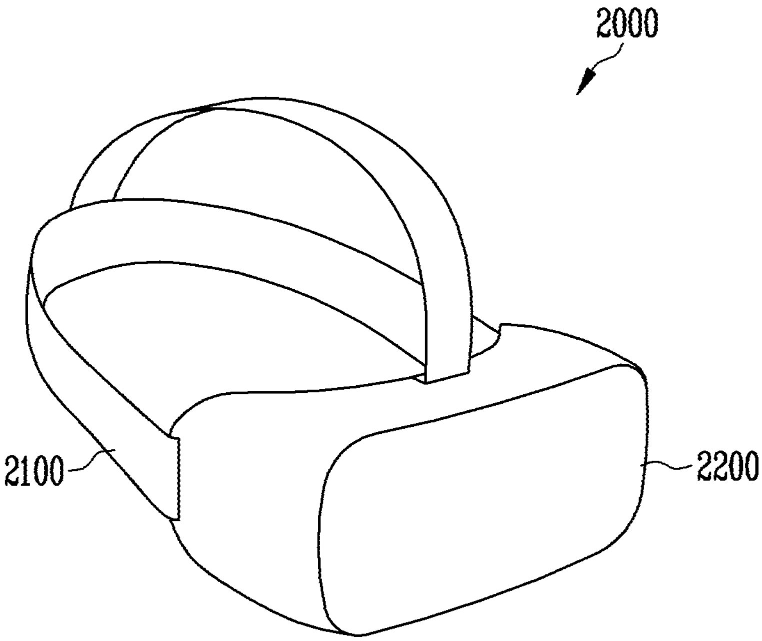
FIG. 17 is a perspective view illustrating an application example of a display system shown in FIG. 16.

FIG. 17 is a perspective view illustrating an application example of the display system shown in FIG. 16.

Referring to FIG. 17, the display system 1000 shown in FIG. 16 may be applied to a head mounted display device 2000. The head mounted display device 2000 may be a wearable electronic device which can be worn on a head of a user.

The head mounted display device 2000 may include a head mounting band 2100 and a display device accommodating case 2200. The head mounting band 2100 may be connected to the display device accommodating case 2200. The head mounting band 2100 may include a horizontal band and/or a vertical band, used to fix the head mounted display device 2000 to the head of the user. The horizontal band may be configured to surround a side portion of the head of the user, and the vertical band may be configured to surround an upper portion of the head of the user. However, embodiments are not limited thereto. For example, the head mounting band 2100 may be implemented in the form of a glasses frame, a helmet or the like.

The display device accommodating case 2200 may accommodate the first and second display devices 1210 and 1220 shown in FIG. 16. The display device accommodating case 2200 may further accommodate the processor 1100 shown in FIG. 16.

Figure 18:
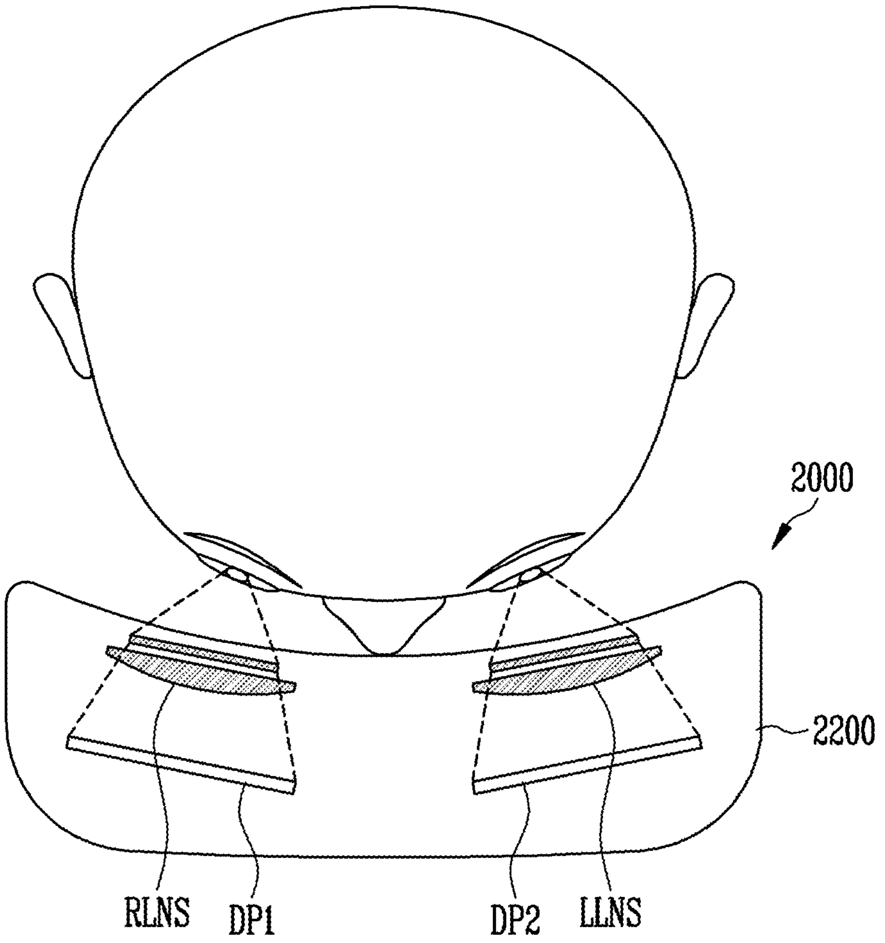
FIG. 18 is a diagram illustrating a head-mounted display device worn by a user shown in FIG. 17.

FIG. 18 is a view illustrating a head mounted display device shown in FIG. 17, which is worn by a user.

Referring to FIG. 18, a first display panel DP1 of the first display device 1210 and a second display panel DP2 of the second display device 1220 may be located in the head mounted display device 2000. The head mounted display device 2000 may further include one or more lenses LLNS and RLNS.

In the display device accommodating case 2200, a right-eye lens RLNS may be located between the first display panel DP1 and a right eye of the user. In the display device accommodating case 2200, a left-eye lens LLNS may be located between the second display panel DP2 and a left eye of the user.

An image output from the first display panel DP1 may be viewed by the right eye of the user through the right-eye lens RLNS. The right-eye lens RLNS may refract light emitted from the first display panel DP1 to face the right eye of the user. The right-eye lens RLNS may perform an optical function for adjusting a viewing distance between the first display panel DP1 and the right eye of the user.

An image output from the second display panel DP2 may be viewed by the left eye of the user through the left-eye lens LLNS. The left-eye lens LLNS may refract light emitted from the second display panel DP2 to face the left eye of the user. The left-eye lens LLNS may perform an optical function for adjusting a viewing distance between the second display panel DP2 and the left eye of the user.

According to some embodiments, each of the right-eye lens RLNS and the left-eye lens LLNS may include an optical lens having a pancake-shaped section. According to some embodiments, each of the right-eye lens RLNS and the left-eye lens LLNS may include a multi-channel lens including sub-areas having different optical characteristics. Each display panel may output images respectively corresponding to the sub-areas of the multi-channel lens, and the output images may be viewed by the user while respectively passing through corresponding sub-areas.

In the display device and the electronic device including the display device according to some embodiments of the present disclosure, a gate line may be divided according to a distance between a gate driver and a pixel, so that a gate line delay can be relatively reduced, and display quality can be relatively improved.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present disclosure as set forth in the following claims, and their equivalents.

What is claimed is:

1. A display device comprising:

a display panel including a first block and a second block, the display panel having a plurality of pixels; and a first gate driver configured to provide a gate signal to the first block and the second block, wherein the first gate driver:

provides the gate signal to a first sub-gate line, the first sub-gate line being connected to the first block, through a first path comprising a first buffer and a first slew rate controller; and provides the gate signal to a second sub-gate line, the second sub-gate line being connected to the second block, through a second path comprising a second buffer, and wherein the first block is closer to the first gate driver than the second block, and wherein the second path is different from the first path.

2. The display device of claim 1, wherein the first slew rate controller is configured to control a slew rate of the first sub-gate line such that the slew rate of the first sub-gate line and a slew rate of the second sub-gate line are equal.

3. The display device of claim 1, wherein numbers of inverters included in the first buffer and the second buffer are equal.

4. The display device of claim 1, wherein a number of inverters included in the first buffer is smaller than a number of inverters included in the second buffer.

5. The display device of claim 1, wherein a pixel most distant from the first gate driver in the first block and a pixel closest to the first gate driver in the second block have a same resistor-capacitor delay value.

6. The display device of claim 1, further comprising a dummy gate line in the second block to have a same pattern shape as pixels of the first block.

7. The display device of claim 6, wherein the dummy gate line extends in a direction distant from the first gate driver at a scan start point of the second block.

8. The display device of claim 7, wherein the dummy gate line extends with a margin at the scan start point of the second block.

9. The display device of claim 6, wherein the second sub-gate line and the dummy gate line are formed in a same metal layer.

10. The display device of claim 1, wherein a scan start point of the second sub-gate line in the second block is a middle point of the second block.

11. The display device of claim 1, wherein a scan start point of the second sub-gate line in the second block is a pixel closest to the first gate driver in the second block.

12. The display device of claim 1, wherein a scan start point of the second sub-gate line in the second block is a pixel most distant from the first gate driver in the second block.

13. The display device of claim 1, wherein the display panel further includes a third block and a fourth block, wherein the display device further comprises a second gate driver configured to provide the gate signal to the third block and the fourth block, wherein the second gate driver is configured to:

provide the gate signal to a third sub-gate line connected to the third block through a third buffer and a second slew rate controller; and provide the gate signal to a fourth sub-gate line connected to the fourth block through a fourth buffer, and wherein the third block is closer to the first gate driver than the fourth block.

14. A display device comprising:

a display panel including a first block and a second block, the display panel having a plurality of pixels;

a first gate driver configured to provide a gate signal to the first block and the second block, wherein the first gate driver is configured to:

provide the gate signal to a first sub-gate line, the first sub-gate line being connected to the first block, through a first buffer; and provide the gate signal to a second sub-gate line, the second sub-gate line being connected to the second block, through a second buffer without passing through a first slew rate controller, and wherein the first block is closer to the first gate driver than the second block; and a dummy gate line in the second block to have a same pattern shape as pixels of the first block, wherein the dummy gate line extends with a margin at a scan start point of the second block.

15. The display device of claim 14, wherein a number of inverters included in the first buffer is smaller than a number of inverters included in the second buffer.

16. The display device of claim 14, wherein the first buffer is configured to control a slew rate of the first sub-gate line such that the slew rate of the first sub-gate line and a slew rate of the second sub-gate line are equal.

17. The display device of claim 14, wherein the first gate driver is configured to provide the gate signal to the first sub-gate line through the first buffer and a slew rate controller, and wherein a number of inverters included in the first buffer is equal to a number of inverters included in the second buffer.

18. The display device of claim 14, wherein a pixel most distant from the first gate driver in the first block and a pixel closest to the first gate driver in the second block have a same resistor-capacitor delay value.

19. The display device of claim 14, further comprising a dummy gate line in the second block to have a same pattern shape as pixels of the first block, wherein the dummy gate line extends in a direction distant from the first gate driver at the scan start point of the second block.

20. An electronic device comprising:

a processor; and a display device configured to display an image in response to control of the processor, wherein the display device includes:

a display panel including a first block and a second block, the display panel having a plurality of pixels located therein;

a first gate driver configured to provide a gate signal to the first block and the second block, wherein the first gate driver:

provides the gate signal to a first sub-gate line, the first sub-gate line being connected to the first block, through a first buffer and a first slew rate controller; and provides the gate signal to a second sub-gate line, the second sub-gate line being connected to the second block, through a second buffer without passing through the first slew rate controller, and wherein the first block is closer to the first gate driver than the second block.

* * * * *